United States Patent
Tanaka et al.

(10) Patent No.: US 11,209,165 B2
(45) Date of Patent: Dec. 28, 2021

(54) EXHAUST GAS TREATMENT DEVICE AND EXHAUST GAS TREATMENT METHOD

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Yokohama (JP)

( * ) Notice: Subject to any disclaimer, the term of this patent is extended or adjusted under 35 U.S.C. 154(b) by 563 days.

(21) Appl. No.: 16/322,049

(22) PCT Filed: Feb. 20, 2018

(86) PCT No.: PCT/JP2018/005944
§ 371 (c)(1),
(2) Date: Jan. 30, 2019

(87) PCT Pub. No.: WO2019/162991
PCT Pub. Date: Aug. 29, 2019

(65) Prior Publication Data
US 2021/0356129 A1 Nov. 18, 2021

(51) Int. Cl.
| | | |
|---|---|---|
| *F01K 23/10* | (2006.01) | |
| *F23R 3/40* | (2006.01) | |
| *B01D 53/34* | (2006.01) | |
| *B01D 53/62* | (2006.01) | |
| *B01D 53/75* | (2006.01) | |
| *B01D 53/78* | (2006.01) | |
| *B01D 53/86* | (2006.01) | |
| *B01D 53/90* | (2006.01) | |

(52) U.S. Cl.
CPC .............. *F23R 3/40* (2013.01); *B01D 53/343* (2013.01); *B01D 53/62* (2013.01); *B01D 53/75* (2013.01); *B01D 53/78* (2013.01); *B01D 53/8625* (2013.01); *B01D 53/8696* (2013.01); *B01D 53/90* (2013.01); *F01K 23/10* (2013.01); *B01D 2257/404* (2013.01); *B01D 2257/504* (2013.01); *B01D 2258/0283* (2013.01)

(58) Field of Classification Search
CPC ...... B01D 53/56; B01D 53/565; B01D 53/62; B01D 53/74; B01D 53/75; B01D 53/8625; B01D 2257/404; B01D 2257/504; B01D 2258/01; B01D 2258/0283; F01N 3/0857; F01N 3/2066; F01N 5/00; F01N 2250/12; F01N 2570/10; F01N 2570/14; Y02C 20/40; Y02E 20/32
See application file for complete search history.

(56) References Cited

U.S. PATENT DOCUMENTS

| | | |
|---|---|---|
| 2009/0252659 A1 | 10/2009 | Iijima et al. |
| 2009/0282803 A1 | 11/2009 | Bono et al. |
| 2013/0031910 A1 | 2/2013 | Merchant et al. |
| 2014/0373720 A1 | 12/2014 | Nakagawa et al. |

FOREIGN PATENT DOCUMENTS

| | | |
|---|---|---|
| EP | 2423576 A2 | 2/2012 |
| JP | H04-52401 A | 2/1992 |
| JP | H06-011132 A | 1/1994 |
| JP | H08-326508 A | 12/1996 |
| JP | H09-075674 A | 3/1997 |
| JP | H09-170402 A | 6/1997 |
| JP | H10-109017 A | 4/1998 |
| JP | H11-280413 A | 10/1999 |
| JP | 2002-028450 A | 1/2002 |
| JP | 2002-122301 A | 4/2002 |
| JP | 2002-177740 A | 6/2002 |
| JP | 2004-019484 A | 1/2004 |
| JP | 2009-248081 A | 10/2009 |
| JP | 5291449 B2 | 9/2013 |
| JP | 2014-226622 A | 12/2014 |

OTHER PUBLICATIONS

Written Opinion of the International Searching Authority issued in corresponding International Application No. PCT/JP2018/005944 dated Apr. 17, 2018, with translation (9 pages).
European Extended Search Report in corresponding European Application No. 18836225.5, dated Sep. 7, 2021 (9 pages).

*Primary Examiner* — Timothy C Vanoy
(74) *Attorney, Agent, or Firm* — Osha Bergman Watanabe & Burton LLP

(57) ABSTRACT

An exhaust gas treatment device includes an exhaust gas line through which a combustion exhaust gas discharged from a power generation facility flows, a waste heat recovery boiler recovering waste heat of the combustion exhaust gas, a branch exhaust gas line provided to be connected between a front stage and a downstream stage of the waste heat recovery boiler on a main exhaust gas line, a nitrogen oxide removal unit removing nitrogen oxide in an integrated combustion exhaust gas into which a combustion exhaust gas flowing through the main exhaust gas line and a combustion exhaust gas flowing through the branch exhaust gas line are integrated, an integrated waste heat recovery boiler recovering waste heat of the integrated combustion exhaust gas from which nitrogen oxide has been removed, and a $CO_2$ recovery unit recovering $CO_2$ in the integrated combustion exhaust gas.

14 Claims, 7 Drawing Sheets

EXHAUST GAS TREATMENT DEVICE AND EXHAUST GAS TREATMENT METHOD

TECHNICAL FIELD

The present invention relates to an exhaust gas treatment device and an exhaust gas treatment method, and for example, relates to an exhaust gas treatment device and an exhaust gas treatment method for treating combustion exhaust gas exhausted from a power generation facility or the like.

BACKGROUND ART

In the past, there has been proposed an exhaust gas treatment device including a plurality of exhaust gas flow paths which are connected to a plurality of gas turbines and includes a waste heat recovery boiler recovering waste heat of combustion exhaust gas discharged from the gas turbines (see Patent Document 1, for example). In the exhaust gas treatment device, the waste heat of the combustion exhaust gas discharged from each gas turbine is recovered by the waste heat recovery boiler provided to each exhaust gas flow path. Then, the combustion exhaust gas, from which the waste heat has been recovered, in each of the exhaust gas flow paths is integrated into an integrated combustion exhaust gas, and thereafter, carbon dioxide ($CO_2$) in the integrated combustion exhaust gas is recovered by a $CO_2$ absorbing liquid in a $CO_2$ recovery device.

CITATION LIST

Patent Documents

Patent Document 1: JP 5291449 B

SUMMARY OF INVENTION

Problem to be Solved by the Invention

Here, in the exhaust gas treatment device, a component derived from nitrogen oxide contained in the combustion exhaust gas (for example, nitrogen dioxide ($NO_2$)) accumulates as an accumulated component in the $CO_2$ absorbing liquid, and therefore, it is preferable to provide a nitrogen oxide removal device for removing nitrogen oxide in the exhaust gas on a front stage of the carbon dioxide recovery device. The nitrogen oxide removal device needs to be provided on a front stage of a waste heat recovery device in order to efficiently remove nitrogen oxide, because a nitrogen oxide removal efficiency decreases when a temperature of the exhaust gas decreases to lower than a predetermined temperature (for example, less than 300° C.). However, in the exhaust gas treatment device including a plurality of exhaust gas flow paths connected to a plurality of gas turbines, the nitrogen oxide removal device needs to be provided on a front stage of the waste heat recovery boiler of each exhaust gas flow path, and the exhaust gas treatment device may increase in size, thus increasing facility cost.

The present invention has an object to provide an exhaust gas treatment device and an exhaust gas treatment method capable of reducing an accumulation amount of the nitrogen oxide-derived component in the $CO_2$ absorbing liquid and capable of reducing the increase in the facility cost.

Solution to Problem

An exhaust gas treatment device according to the present invention includes: a first exhaust gas flow path through which a first combustion exhaust gas discharged from a power generation facility flows; a waste heat recovery unit provided to the first exhaust gas flow path and recovers waste heat of the first combustion exhaust gas; a second exhaust gas flow path branched from the first exhaust gas flow path and provided between a front stage and downstream stage of the waste heat recovery unit on the first exhaust gas flow path, in which at least a part of the first combustion exhaust gas flowing through the first exhaust gas flow path flows, as a second combustion exhaust gas, through the second exhaust gas flow path; a nitrogen oxide removal unit configured to remove nitrogen oxide in an integrated combustion exhaust gas into which the first combustion exhaust gas and the second combustion exhaust gas are integrated, the first combustion exhaust gas flowing through the first exhaust gas flow path with the waste heat of the first combustion exhaust gas having been recovered by the waste heat recovery unit, and the second combustion exhaust gas flowing through the second exhaust gas flow path with a temperature of the second combustion exhaust gas being higher relative to the first combustion exhaust gas; an integrated waste heat recovery unit configured to recover waste heat of the integrated combustion exhaust gas with the nitrogen oxide having been removed by the nitrogen oxide removal unit; and a $CO_2$ recovery unit configured to recover $CO_2$ in the integrated combustion exhaust gas by a $CO_2$ absorbing liquid with the waste heat of the integrated combustion exhaust gas having been recovered by the integrated waste heat recovery unit.

According to this configuration, the combustion exhaust gas discharged from the power generation facility is branched into the first exhaust gas flow path and the second exhaust gas flow path, and thereafter, the waste heat of the first combustion exhaust gas flowing through the first exhaust gas flow path is recovered by the waste heat recovery unit, while the first combustion exhaust gas is integrated with the second combustion exhaust gas flowing through the second exhaust gas flow path in a state of the temperature thereof being higher relative to the first combustion exhaust gas from which the waste heat has been recovered by the waste heat recovery unit, and then, the integrated combustion exhaust gas is resulted. This can adjust the temperature of the integrated combustion exhaust gas introduced into the nitrogen oxide removal unit to a range suitable for decomposing and removing nitrogen oxide, such that nitrogen oxide in the combustion exhaust gas discharged from the power generation facility can be efficiently removed. Since the temperature of the integrated combustion exhaust gas can be adjusted to be in a range suitable for decomposing and removing nitrogen oxide only by providing the second exhaust gas flow path, the increase in the facility cost can be also reduced. Therefore, the exhaust gas treatment device can be achieved in which nitrogen oxide can be efficiently removed and the increase in the facility cost can be reduced.

The exhaust gas treatment device according to the present invention preferably further includes a control unit that adjusts a flow rate of the first combustion exhaust gas flowing through the first exhaust gas flow path and a flow rate of the second combustion exhaust gas flowing through the second exhaust gas flow path to control such that a temperature of the integrated combustion exhaust gas introduced into the nitrogen oxide removal unit is 300° C. or higher and 400° C. or lower. This configuration enables the gas temperature of the integrated combustion exhaust gas introduced into the nitrogen oxide removal unit to be 300° C. or higher and 400° C. or lower that is suitable for decomposition treatment of nitrogen oxide, such that the accumulation amount of the nitrogen oxide-derived component in the $CO_2$ absorbing liquid in the $CO_2$ recovery unit can be efficiently reduced.

An exhaust gas treatment device according to the present invention includes a first exhaust gas flow path through which a first combustion exhaust gas discharged from a first power generation facility flows; a second exhaust gas flow path through which a second combustion exhaust gas discharged from a second power generation facility flows; a waste heat recovery unit that is provided to the first exhaust gas flow path and recovers waste heat of the first combustion exhaust gas; a nitrogen oxide removal unit configured to remove nitrogen oxide in an integrated combustion exhaust gas into which the first combustion exhaust gas and the second combustion exhaust gas are integrated, the first combustion exhaust gas flowing through the first exhaust gas flow path with the waste heat of the first combustion exhaust gas having been recovered by the waste heat recovery unit, and the second combustion exhaust gas flowing through the second exhaust gas flow path with a temperature of the second combustion exhaust gas being higher relative to the first combustion exhaust gas; an integrated waste heat recovery unit configured to recover waste heat of the integrated combustion exhaust gas with the nitrogen oxide having been removed by the nitrogen oxide removal unit; and a $CO_2$ recovery unit that recovers $CO_2$ in the integrated combustion exhaust gas by a $CO_2$ absorbing liquid with the waste heat of the integrated combustion exhaust gas having been recovered by the integrated waste heat recovery unit.

According to this configuration, the waste heat of the first combustion exhaust gas discharged from the first power generation facility is recovered by the waste heat recovery unit, while the first combustion exhaust gas is integrated with the second combustion exhaust gas flowing through the second exhaust gas flow path in a state of the temperature thereof being higher relative to the first combustion exhaust gas from which the waste heat has been recovered by the waste heat recovery unit, and then, the integrated combustion exhaust gas is resulted. This can adjust the temperature of the integrated combustion exhaust gas introduced into the nitrogen oxide removal unit to a range suitable for decomposing and removing nitrogen oxide, such that nitrogen oxide in the combustion exhaust gas discharged from the power generation facility can be efficiently removed. Since nitrogen oxide in the integrated combustion exhaust gas can be efficiently removed without providing the waste heat recovery unit to the second exhaust gas flow path, the increase in the facility cost can be also reduced. Therefore, the exhaust gas treatment device can be achieved in which nitrogen oxide can be efficiently removed and the increase in the facility cost can be reduced.

The exhaust gas treatment device according to the present invention preferably further includes a control unit configured to adjust a flow rate of each of the combustion exhaust gases flowing through the first exhaust gas flow path and the second exhaust gas flow path to control such that a temperature of the integrated combustion exhaust gas introduced into the nitrogen oxide removal unit is 300° C. or higher and 400° C. or lower. This configuration enables the gas temperature of the integrated combustion exhaust gas introduced into the nitrogen oxide removal unit to be 300° C. or higher and 400° C. or lower that is suitable for decomposition treatment of nitrogen oxide, such that the accumulation amount of the nitrogen oxide-derived component in the $CO_2$ absorbing liquid in the $CO_2$ recovery unit can be efficiently reduced.

In the exhaust gas treatment device according to the present invention, the nitrogen oxide removal unit is preferably provided within the integrated waste heat recovery unit. This configuration enables the integrated waste heat recovery unit and the nitrogen oxide removal unit to be formed into one body, and therefore, facilities of the exhaust gas treatment device can be reduced in size and simplified.

In the exhaust gas treatment device according to the present invention, the nitrogen oxide removal unit preferably includes a reducing agent injection unit configured to inject a nitrogen oxide removal catalyst removing the nitrogen oxide and a reducing agent. According to this configuration, the reducing agent and the nitrogen oxide removal catalyst enable nitrogen oxide contained in the integrated combustion gas to be further more efficiently decomposed and removed.

The exhaust gas treatment device according to the present invention preferably further includes: a control unit configured to control a supply amount of the reducing agent, based on a gas flow rate and nitrogen oxide concentration of the integrated combustion exhaust gas introduced into the $CO_2$ recovery unit. This configuration enables nitrogen oxide in the integrated combustion exhaust gas introduced into the $CO_2$ recovery unit to be easily controlled to be in a desired concentration range.

In the exhaust gas treatment device according to the present invention, the integrated waste heat recovery unit preferably generates a $CO_2$ compression portion-driving steam for compressing $CO_2$ discharged from the $CO_2$ recovery unit by using the waste heat of the integrated combustion exhaust gas with the nitrogen oxide having been removed, and supplies the generated $CO_2$ compression portion-driving steam to a $CO_2$ compression portion. This configuration makes it possible to effectively utilize the waste heat of the integrated combustion exhaust gas as the $CO_2$ compression portion-driving steam, and therefore, an operation cost of the exhaust gas treatment device can be reduced.

In the exhaust gas treatment device according to the present invention, the integrated waste heat recovery unit preferably generates a turbine-driving steam by using the waste heat of the integrated combustion exhaust gas with the nitrogen oxide having been removed, and supplies the generated turbine-driving steam to a steam turbine. This configuration makes it possible to effectively utilize the waste heat of the integrated combustion exhaust gas as the turbine-driving steam, and therefore, an operation cost of the exhaust gas treatment device can be reduced.

The exhaust gas treatment device according to the present invention preferably includes a heating unit configured to heat the integrated combustion exhaust gas provided on a front stage of the nitrogen oxide removal unit, the integrated waste heat recovery unit generates the turbine-driving steam by using the waste heat of the integrated combustion exhaust gas heated by the heating unit, and supplies the generated turbine-driving steam to the steam turbine. This configuration makes it possible to effectively utilize the waste heat of the integrated combustion exhaust gas as the turbine-driving steam, and therefore, an operation cost of the exhaust gas treatment device can be reduced. The heating unit can also adjust the temperature of the integrated combustion exhaust gas introduced into the integrated waste heat recovery unit to a desired temperature range.

In the exhaust gas treatment device according to the present invention, a control unit is preferably configured to measure the temperature and gas flow rate of the integrated combustion exhaust gas introduced into the nitrogen oxide removal unit, and controls at least one of an amount of a fuel supplied to a combustor in the power generation facility and an amount of the steam supplied to the steam turbine, based on the measured temperature and gas flow rate. This configuration enables control of the temperature and flow rate of the integrated combustion exhaust gas introduced into the nitrogen oxide removal unit to be in a desired range.

In the exhaust gas treatment device according to the present invention, the power generation facility preferably includes an existing power generation facility. According to this configuration, the temperature of the integrated combustion exhaust gas can be adjusted to be in a range suitable for decomposing and removing nitrogen oxide by also providing the first gas flow path and the second gas flow path to the existing power generation facility, and thus the increase in the facility cost can be also reduced.

An exhaust gas treatment method according to the present invention includes the steps of: removing nitrogen oxide in an integrated combustion exhaust gas into which a first combustion exhaust gas and a second combustion exhaust gas are integrated, the first combustion exhaust gas being discharged from a power generation device with waste heat of the first combustion exhaust gas having been recovered by a waste heat recovery unit which is provided to a first exhaust gas flow path, and the second combustion exhaust gas flowing through a second exhaust gas flow path which is provided to be connected between a front stage and a downstream stage of the waste heat recovery unit on the first exhaust gas flow path with a temperature of the second combustion exhaust gas being higher relative to the first combustion exhaust gas from which the waste heat has been recovered by the waste heat recovery unit; recovering waste heat of the integrated combustion exhaust gas with the nitrogen oxide having been removed; and recovering $CO_2$ in the integrated combustion exhaust gas by a $CO_2$ absorbing liquid, the waste heat of the integrated combustion exhaust gas having been recovered.

According to this method, the waste heat of the first combustion exhaust gas flowing through the first exhaust gas flow path is recovered by the waste heat recovery unit, while the first combustion exhaust gas is integrated with the second combustion exhaust gas flowing through the second exhaust gas flow path in a state of the temperature thereof being higher relative to the first combustion exhaust gas from which the waste heat has been recovered by the waste heat recovery unit, and then, the integrated combustion exhaust gas is resulted. This can adjust the temperature of the integrated combustion exhaust gas to a range suitable for decomposing and removing nitrogen oxide, such that nitrogen oxide in the combustion exhaust gas discharged from the power generation facility can be efficiently removed. Since nitrogen oxide in the combustion exhaust gas discharged from the power generation facility can be efficiently removed without providing the nitrogen oxide removal unit to the second exhaust gas flow path, the increase in the facility cost can be also reduced. Therefore, the exhaust gas treatment device can be achieved in which nitrogen oxide can be efficiently removed and the increase in the facility cost can be reduced.

An exhaust gas treatment method according to the present invention includes: removing nitrogen oxide in an integrated combustion exhaust gas into which a first combustion exhaust gas and a second combustion exhaust gas are integrated, the first combustion exhaust gas being discharged from a first power generation device with waste heat of the first combustion exhaust gas having been recovered by a waste heat recovery unit which is provided to a first exhaust gas flow path, and the second combustion exhaust gas being discharged from a second power generation device and flowing through a second exhaust gas flow path with a temperature of the second combustion exhaust gas being higher relative to the first combustion exhaust gas from which the waste heat has been recovered by the waste heat recovery unit; removing nitrogen oxide in the integrated combustion exhaust gas into which combustion exhaust gases are integrated, the combustion exhaust gases being discharged and flowing through a plurality of exhaust gas flow paths at least one of which is provided with a waste heat recovery unit that recovers waste heat of the combustion exhaust gas; recovering waste heat of the integrated combustion exhaust gas with the nitrogen oxide having been removed; and recovering $CO_2$ in the integrated combustion exhaust gas by a $CO_2$ absorbing liquid, the waste heat of the integrated combustion exhaust gas having been recovered.

According to this method, the waste heat of the first combustion exhaust gas discharged from the first power generation facility is recovered by the waste heat recovery unit, while the first combustion exhaust gas is integrated with the second combustion exhaust gas flowing through the second exhaust gas flow path in a state of the temperature thereof being higher relative to the first combustion exhaust gas from which the waste heat has been recovered by the waste heat recovery unit, and then, the integrated combustion exhaust gas is resulted. This can adjust the temperature of the integrated combustion exhaust gas to a range suitable for decomposing and removing nitrogen oxide, such that nitrogen oxide in the combustion exhaust gas discharged from the power generation facility can be efficiently removed. Since nitrogen oxide in the integrated combustion exhaust gas can be efficiently removed without providing the waste heat recovery unit to the second exhaust gas flow path, the increase in the facility cost can be also reduced. Therefore, the exhaust gas treatment device can be achieved in which nitrogen oxide can be efficiently removed and the increase in the facility cost can be reduced.

Advantageous Effect of Invention

According to this method, an exhaust gas treatment device and an exhaust gas treatment method can be achieved which are capable of reducing the accumulation amount of the nitrogen oxide-derived component in the $CO_2$ absorbing liquid and capable of reducing the increase in the facility cost.

DESCRIPTION OF EMBODIMENTS

The present inventors have focused on a matter that, according to an exhaust gas treatment device of related art, in order to efficiently remove nitrogen oxide in the combustion exhaust gas, a temperature of the combustion exhaust gas introduced into a nitrogen oxide removal unit needs to be kept at high temperature (for example, 300° C. or higher and 400° C. or lower), while the facility cost increases in a case where the nitrogen oxide removal unit is provided on a front stage of each of waste heat recovery units in a plurality of exhaust gas flow paths. Then, the present inventors have conceived an idea of dividing and causing the combustion exhaust gas discharged from the power generation facility to flow as a first combustion exhaust gas from which the waste heat has been recovered by the waste heat recovery unit and a second combustion exhaust gas from which the waste heat has not been recovered and of which a temperature is higher than the first combustion exhaust gas, and thereafter, integrating the first combustion exhaust gas and the second combustion exhaust gas into an integrated combustion exhaust gas to be introduced into the nitrogen oxide removal unit. From this idea, the present inventors have found that it is possible to make a gas temperature of the integrated combustion exhaust gas a temperature suitable for decomposing and removing nitrogen oxide, reduce an accumulation amount of a nitrogen oxide-derived component in a $CO_2$ absorbing liquid in a $CO_2$ recovery unit, and reduce increase in the facility cost, and completed the present invention.

Hereinafter, embodiments of the present invention will be described in detail while referring to the attached drawings. Note that the present invention is not limited to the following embodiments and the present invention can be carried out by applying suitable modifications.

First Embodiment

Figure 1:
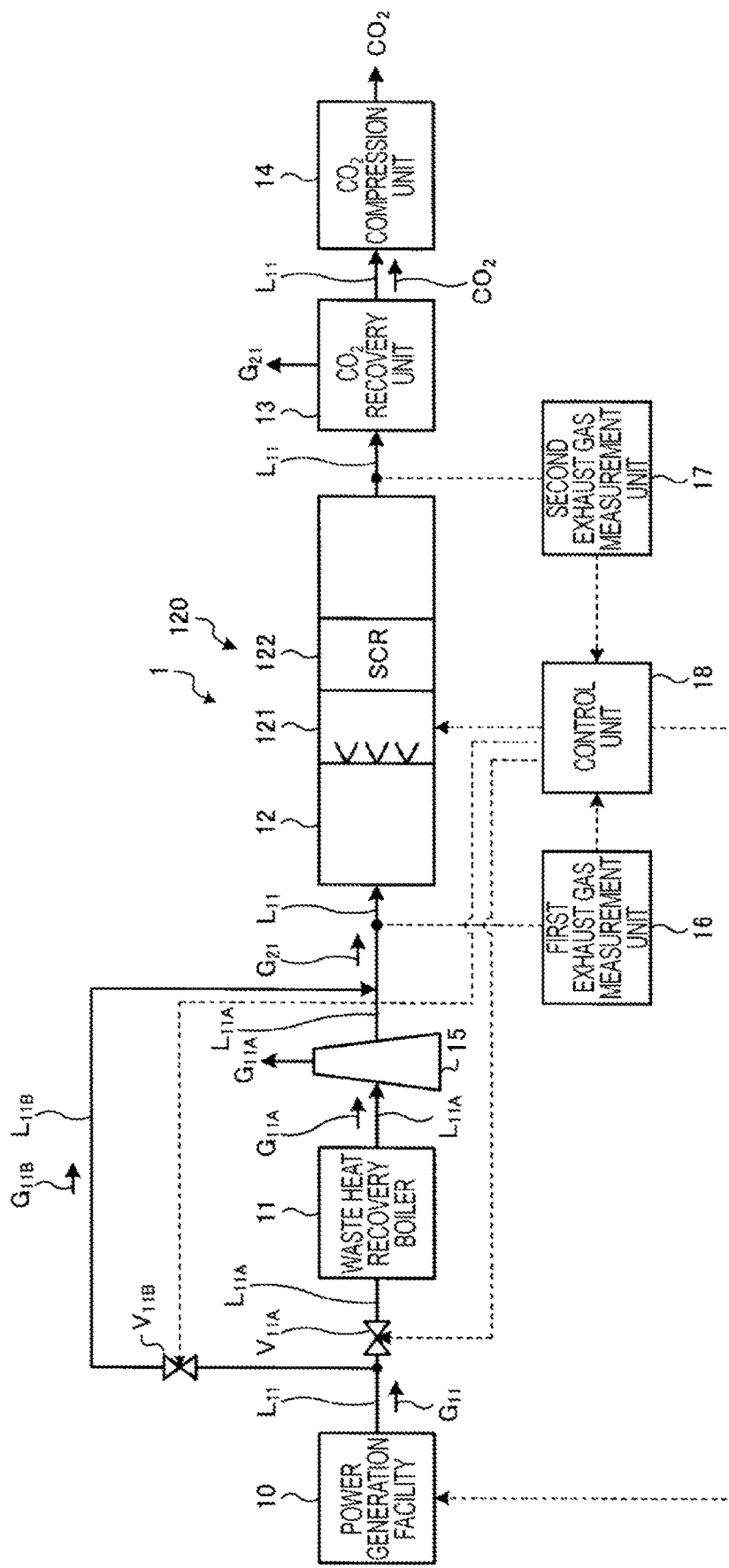
FIG. 1 is a schematic diagram illustrating an example of an exhaust gas treatment device according to a first embodiment.

FIG. 1 is a schematic view illustrating an example of an exhaust gas treatment device 1 according to a first embodiment of the present invention. As illustrated in FIG. 1, the exhaust gas treatment device 1 according to the present embodiment recovers, by a waste heat recovery boiler 11 and an integrated waste heat recovery boiler 12, waste heat of a combustion exhaust gas $G_{11}$ discharged from a power generation facility 10 generating the combustion exhaust gas $G_{11}$, and thereafter, recovers $CO_2$ contained in an integrated combustion exhaust gas $G_{21}$ by a $CO_2$ recovery unit 13. The exhaust gas treatment device 1 includes the power generation facility 10 discharging the combustion exhaust gas $G_{11}$, the waste heat recovery boiler 11 provided on a downstream stage of the power generation facility 10 in a flow direction of the combustion exhaust gas $G_{11}$, the integrated waste heat recovery boiler 12 provided on a downstream stage of the waste heat recovery boiler 11, the $CO_2$ recovery unit 13 provided on a downstream stage of the integrated waste heat recovery boiler 12, and a $CO_2$ compression portion 14 provided on a downstream stage of the $CO_2$ recovery unit 13. A stack 15 discharging a part of the combustion exhaust gas $G_{11}$ is provided between the waste heat recovery boiler 11 and the integrated waste heat recovery boiler 12.

Figure 2:
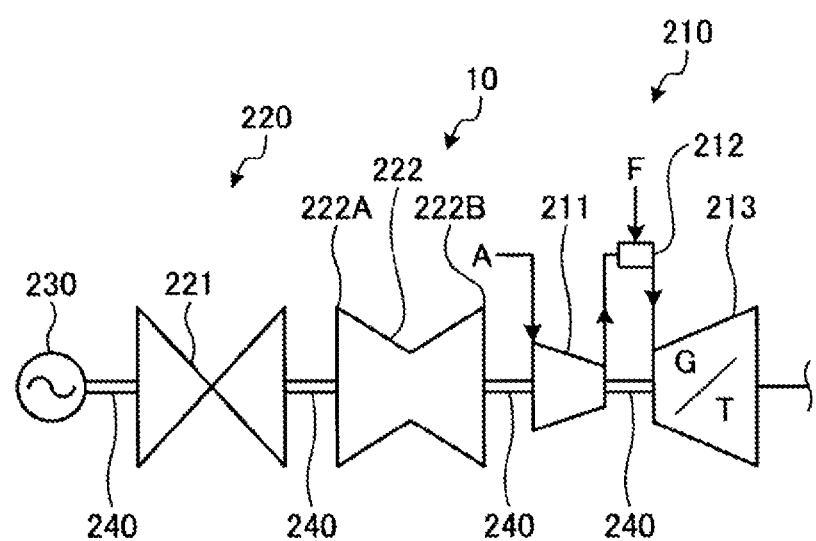
FIG. 2 is a schematic diagram of a power generation facility according to the first embodiment.

FIG. 2 is a schematic view of the power generation facility 10 according to the present embodiment. As illustrated in FIG. 2, the power generation facility 10 is a single-shaft type combined power generation facility (gas turbine combined cycle) in which a gas turbine 210, a steam turbine 220, and a generator 230 are configured in one shaft. The gas turbine 210 includes a compressor 211 that compresses an air A, a combustor 212 that combusts a fuel F with the air A compressed by the compressor 211, and a turbine 213 that is rotationally driven by a combustion gas generated in the combustor 212. The compressor 211 is connected to the turbine 213 via a turbine shaft 240.

The steam turbine 220 includes a low-pressure steam turbine 221 that is rotationally driven by a low-pressure steam, and a medium-pressure/high-pressure steam turbine 222 in which a mid-pressure steam turbine 222A that is rotationally driven by a medium-pressure steam is connected to a high-pressure steam turbine 222B that is rotationally driven by a high-pressure steam. The low-pressure steam turbine 221 and the medium-pressure/high-pressure steam turbine 222 are connected to the generator 230 and the gas turbine 210 via the turbine shaft 240. The generator 230 generates power by the rotational drive of the gas turbine 210 and the steam turbine 220 via the turbine shaft 240.

The power generation facility 10 supplies the combustion exhaust gas $G_{11}$ generated by the power generation to the waste heat recovery boiler 11 via an exhaust gas line $L_{11}$. The exhaust gas line $L_{11}$ is provided with a branch exhaust gas line $L_{11B}$ between a front stage and a downstream stage of the waste heat recovery boiler 11 in the exhaust gas line $L_{11}$, the branch exhaust gas line $L_{11B}$ branching from the exhaust gas line $L_{11}$. Specifically, in the present embodiment, the exhaust gas line $L_{11}$ is branched into a main exhaust gas line (first exhaust gas flow path) $L_{11A}$ and a branch exhaust gas line (second exhaust gas flow path) $L_{11B}$ between the front stage and the downstream stage of the waste heat recovery boiler 11.

The exhaust gas line $L_{11}$ is provided with a flow rate control valve $V_{11A}$, the waste heat recovery boiler 11, and the stack 15 in this order. The flow rate control valve $V_{11A}$ adjusts a flow rate of the combustion exhaust gas (first combustion exhaust gas) $G_{11A}$ flowing through the main exhaust gas line $L_{11A}$. The waste heat recovery boiler 11 recovers the waste heat of the combustion exhaust gas $G_{11A}$ flowing through the main exhaust gas line $L_{11A}$, and supplies the combustion exhaust gas $G_{11A}$ from which the waste heat has been recovered to the stack 15. The stack 15 discharges a part of the combustion exhaust gas $G_{11A}$ to outside as needed, and supplies the combustion exhaust gas $G_{11A}$ to the integrated waste heat recovery boiler 12. The branch exhaust gas line $L_{11B}$ is provided with a flow rate control valve $V_{11B}$. The flow rate control valve Vim adjusts a flow rate of the combustion exhaust gas (second combustion exhaust gas) $G_{11B}$ flowing through the branch exhaust gas line $L_{11B}$. The branch exhaust gas line $L_{11B}$ supplies a part or all of the combustion exhaust gas $G_{11}$ flowing through the exhaust gas line $L_{11}$ to the integrated waste heat recovery boiler 12 without using the waste heat recovery boiler 11 and the stack 15.

The integrated waste heat recovery boiler 12 is supplied with the integrated combustion exhaust gas $G_{21}$ in which the combustion exhaust gas $G_{11A}$ flowing through the main exhaust gas line $L_{11A}$ and the combustion exhaust gas $G_{11B}$ flowing through the branch exhaust gas line $L_{11B}$ are integrated. The integrated waste heat recovery boiler 12 recovers the waste heat of the integrated combustion exhaust gas $G_{21}$. The integrated waste heat recovery boiler 12 is provided with, within thereof, a nitrogen oxide removal unit 120 that reduces and removes nitrogen oxide such as nitrogen monoxide and nitrogen dioxide contained in the integrated combustion exhaust gas $G_{21}$. In this way, by providing the nitrogen oxide removal unit 120 within the integrated waste heat recovery boiler 12, the exhaust gas treatment device 1 can be reduced in size. Note that the nitrogen oxide removal unit 120 may not be necessarily provided in an integrated form with the integrated waste heat recovery boiler 12, and may be provided outside the integrated waste heat recovery boiler 12.

The nitrogen oxide removal unit 120 includes a reducing agent supply unit 121 that injects a reducing agent into the integrated combustion exhaust gas $G_{21}$ to reduce nitrogen oxide, and a selective catalytic reduction (SCR) unit 122 that is provided on a downstream stage of the reducing agent supply unit 121 and filled with a DeNOx catalyst selectively reducing nitrogen oxide. The reducing agent in the reducing agent supply unit 121 is not specifically limited so long as it can decompose and remove nitrogen oxide such as nitrogen monoxide and nitrogen dioxide. The DeNOx catalyst in the selective catalytic reduction unit 122 is not specifically limited so long as it can decompose and remove nitrogen oxide such as nitrogen monoxide and nitrogen dioxide.

The integrated waste heat recovery boiler 12, in the nitrogen oxide removal unit 120, supplies the reducing agent from the reducing agent supply unit 121 to the integrated combustion exhaust gas $G_{21}$, and performs a decomposition treatment by the selective catalytic reduction unit 122 on nitrogen oxide supplied with the reducing agent. The integrated waste heat recovery boiler 12 recovers the waste heat of the integrated combustion exhaust gas $G_{21}$ of which nitrogen oxide has undergone the decomposition treatment, and supplies the integrated combustion exhaust gas $G_{21}$ from which the waste heat has been recovered to the $CO_2$ recovery unit 13.

The $CO_2$ recovery unit 13 includes a $CO_2$ absorbing tower that recovers carbon dioxide ($CO_2$) in the integrated combustion exhaust gas $G_{21}$ by the $CO_2$ absorbing liquid, and a $CO_2$ regeneration tower that heats the $CO_2$ absorbing liquid having absorbed $CO_2$ to release $CO_2$ from the $CO_2$ absorbing liquid. A $CO_2$ absorbing liquid is not specifically limited so long as it can recover carbon dioxide ($CO_2$) in the integrated combustion exhaust gas $G_{21}$, and an amine series absorbing liquid can be used, for example. The $CO_2$ recovery unit 13 discharges, to outside, the integrated combustion exhaust gas $G_{21}$ from which $CO_2$ has been recovered, and supplies the recovered $CO_2$ to the $CO_2$ compression portion 14. The $CO_2$ compression portion 14 compresses and discharges $CO_2$ supplied from the $CO_2$ recovery unit 13.

The exhaust gas treatment device 1 includes a first exhaust gas measurement unit 16 that measures a gas flow rate and temperature of the integrated combustion exhaust gas $G_{21}$ introduced into the integrated waste heat recovery boiler 12, a second exhaust gas measurement unit 17 that measures a gas flow rate and nitrogen oxide concentration of the integrated combustion exhaust gas $G_{21}$ introduced into the $CO_2$ recovery unit 13, and a control unit 18 that controls a supply amount of a fuel F supplied to the power generation facility 10 and a supply amount of the reducing agent supplied from the reducing agent supply unit 121 to the integrated combustion exhaust gas $G_{21}$. The control unit 18 adjusts opening amounts of the flow rate control valves $V_{11A}$ and $V_{11B}$, and the supply amount of the fuel supplied to the power generation facility 10, based on the gas flow rate and temperature of the integrated combustion exhaust gas $G_1$ measured by the first exhaust gas measurement unit 16. The control unit 18 controls the supply amount of the fuel F supplied to the power generation facility 10, based on the gas flow rate and nitrogen oxide concentration of the integrated combustion exhaust gas $G_1$ measured by the second exhaust gas measurement unit 17. The measurement of the gas flow rate and the temperature by the first exhaust gas measurement unit 16, and the measurement of the gas flow rate and the nitrogen oxide concentration by the second exhaust gas measurement unit 17 are performed using a publicly known method of related art.

The control unit 18 adjusts the opening amounts of the flow rate control valves $V_{11A}$ and $V_{11B}$, and the supply amount of the fuel F supplied to the power generation facility 10 to control such that the temperature of the integrated combustion exhaust gas $G_{21}$ measured by the first exhaust gas measurement unit 16 is 300° C. or higher and 400° C. or lower. By such control, the exhaust gas treatment device 1 can make the temperature of the integrated combustion exhaust gas $G_{21}$ supplied to the nitrogen oxide removal unit 120 in the integrated waste heat recovery boiler 12 a temperature suitable for decomposing and removing nitrogen oxide, so that nitrogen oxide in the integrated combustion exhaust gas $G_{21}$ can be further more efficiently decomposed and removed.

In a case where the temperature of the integrated combustion exhaust gas $G_{21}$ measured by the first exhaust gas measurement unit 16 is lower than 300° C., the control unit 18 controls at least one of the opening amount of the flow rate control valve $V_{11A}$ to be decreased and the opening amount of the flow rate control valve $V_{11B}$ to be increased, so that a ratio, in the integrated combustion exhaust gas $G_{21}$, of the combustion exhaust gas $G_{11B}$ having flowed through the branch exhaust gas line $L_{11B}$ is increased with respect to the combustion exhaust gas $G_{11A}$ having flowed through the main exhaust gas line $L_{11A}$. This can increase the ratio of the combustion exhaust gas $G_{11B}$ relative to the combustion exhaust gas $G_{11A}$, where the temperature of the combustion exhaust gas $G_{11A}$ is decreased because the heat thereof has been recovered by the waste heat recovery boiler 11 and the temperature of the combustion exhaust gas $G_{11B}$ is high because the heat thereof has not been recovered by the waste heat recovery boiler 11, and therefore, the temperature of the integrated combustion exhaust gas $G_{21}$ measured by the first exhaust gas measurement unit 16 increases. The control unit 18 may maintain the opening amounts of the flow rate control valves $V_{11A}$ and $V_{11B}$ to increase the feed amount of the fuel F supplied to the power generation facility 10 so as to increase the temperature of the integrated combustion exhaust gas $G_{21}$.

In a case where the temperature of the integrated combustion exhaust gas $G_{21}$ measured by the first exhaust gas measurement unit 16 exceeds 400° C., the control unit 18 controls at least one of the opening amount of the flow rate control valve $V_{11A}$ to be increased and the opening amount of the flow rate control valve $V_{11B}$ to be decreased, so that the ratio, in the integrated combustion exhaust gas $G_{21}$, of the combustion exhaust gas $G_{11B}$ flowing through the branch exhaust gas line $L_{11B}$ is decreased with respect to the combustion exhaust gas $G_{11A}$ flowing through the main exhaust gas line $L_{11A}$. This can decrease the ratio of the combustion exhaust gas $G_{11B}$ relative to the combustion exhaust gas $G_{11A}$, where the temperature of the combustion exhaust gas $G_{11A}$ is decreased because the heat thereof has been recovered by the waste heat recovery boiler 11, and where the temperature of the combustion exhaust gas $G_{11B}$ is high because the heat thereof has not been recovered by the waste heat recovery boiler 11, and therefore, the temperature of the integrated combustion exhaust gas $G_{21}$ measured by the first exhaust gas measurement unit 16 decreases. The control unit 18 may maintain the opening amounts of the flow rate control valves $V_{11A}$ and $V_{11B}$ to decrease the feed amount of the fuel F supplied to the power generation facility 10 so as to decrease the temperature of the integrated combustion exhaust gas $G_{21}$.

The control unit 18 adjusts the supply amount of the reducing agent supplied from the reducing agent supply unit 121, and controls the nitrogen oxide concentration in the integrated combustion exhaust gas $G_{21}$ measured by the second exhaust gas measurement unit 17 to be a predetermined value or less. In case that the nitrogen oxide concentration in the integrated combustion exhaust gas $G_{21}$ measured by the second exhaust gas measurement unit 17 exceeds the predetermined value, the control unit 18 increases the supply amount of the reducing agent from the reducing agent supply unit 121. In case that the nitrogen oxide concentration in the integrated combustion exhaust gas $G_{21}$ measured by the second exhaust gas measurement unit 17 is less than the predetermined value, the control unit 18 maintains or decreases the supply amount of the reducing agent from the reducing agent supply unit 121. By such control, the exhaust gas treatment device 1 can control the nitrogen oxide concentration in the integrated combustion exhaust gas $G_{21}$ introduced into the $CO_2$ recovery unit 13 to be the predetermined value or less, so that it is possible to efficiently reduce the nitrogen oxide in the integrated combustion exhaust gas $G_{21}$ after $CO_2$ discharged from the $CO_2$ recovery unit 13 is recovered.

Next, the overall operation of the exhaust gas treatment device 1 according to the present embodiment will be described. The combustion exhaust gas $G_{11}$ discharged from the power generation facility 10 via the exhaust gas line $L_{11}$ is branched into the combustion exhaust gas $G_{11A}$ flowing through the main exhaust gas line $L_{11A}$ and the combustion exhaust gas $G_{11B}$ flowing through the branch exhaust gas line $L_{11B}$. The combustion exhaust gas $G_{11A}$ flowing through the main exhaust gas line $L_{11A}$, with the waste heat of the gas $G_{11A}$ being recovered by the waste heat recovery boiler 11 to decrease the temperature, after a part of the gas $G_{11A}$ is discharged from the stack 15, is integrated in the exhaust gas line $L_{11}$ with the combustion exhaust gas $G_{11B}$ flowing through the branch exhaust gas line $L_{11B}$. The combustion exhaust gas $G_{11B}$ flowing through the branch exhaust gas line $L_{11B}$, in a state of a high temperature without via the waste heat recovery boiler 11, is integrated in the exhaust gas line $L_H$ with the combustion exhaust gas $G_{11A}$ flowing through the main exhaust gas line.

The integrated combustion exhaust gas $G_{21}$ in which the combustion exhaust gas $G_{11A}$ and the combustion exhaust gas $G_{11B}$ are integrated is supplied via the exhaust gas line $L_{11}$ to the integrated waste heat recovery boiler 12. Here, the control unit 18 controls valve opening amounts of the flow rate control valves $V_{11A}$ and $V_{11B}$ and the supply amount of the fuel F supplied to the power generation facility 10 as needed, such that the temperature of the integrated combustion exhaust gas $G_{21}$ is a predetermined temperature (for example, 300° C. or higher and 400° C. or lower). The integrated combustion exhaust gas $G_{21}$ supplied to the integrated waste heat recovery boiler 12 is supplied with the reducing agent by the reducing agent supply unit 121 in the nitrogen oxide removal unit 120, and, after nitrogen oxide is decomposed and removed by selective catalytic reduction unit 122, is supplied to the $CO_2$ recovery unit 13. Here, the control unit 18 controls an amount of the reducing agent supplied from the reducing agent supply unit 121 to the integrated combustion exhaust gas $G_{21}$ as needed, such that nitrogen oxide in the integrated combustion exhaust gas $G_{21}$ supplied to the $CO_2$ recovery unit 13 is a predetermined value or less. The integrated combustion exhaust gas $G_{21}$ supplied to the $CO_2$ recovery unit 13, after $CO_2$ is recovered by the $CO_2$ absorbing liquid, is discharged out of the exhaust gas treatment device 1. $CO_2$ in the integrated combustion exhaust gas $G_{21}$ recovered by the $CO_2$ absorbing liquid is heated to be released from the $CO_2$ absorbing liquid, and thereafter, supplied to the $CO_2$ compression portion 14, and compressed and discharged.

As described above, according to the above-described embodiment, the combustion exhaust gas $G_{11}$ discharged from the power generation facility 10 is branched into the main exhaust gas line $L_{11A}$ and the branch exhaust gas line $L_{11B}$, and thereafter, the waste heat of the combustion exhaust gas $G_{11A}$ is recovered by the waste heat recovery boiler 11 provided to the main exhaust gas line $L_{11A}$, while the combustion exhaust gas $G_{11A}$ after the waste heat is recovered is integrated with the combustion exhaust gas $G_{11B}$ flowing through the branch exhaust gas line $L_{11B}$ in a state of high temperature that the temperature is higher than the combustion exhaust gas $G_{11A}$, to be the integrated combustion exhaust gas $G_{21}$. This can adjust the temperature of the integrated combustion exhaust gas $G_{21}$ introduced into the integrated waste heat recovery boiler 12 to a range suitable for decomposing and removing nitrogen oxide, such that nitrogen oxide in the combustion exhaust gas discharged from the power generation facility 10 can be efficiently removed. Since the temperature of the integrated combustion exhaust gas $G_{21}$ can be adjusted to be in a range suitable for decomposing and removing nitrogen oxide by simply providing the branch exhaust gas line $L_{11B}$, the increase in the facility cost can be also reduced. Therefore, the exhaust gas treatment device 1 can be achieved in which nitrogen oxide can be efficiently removed and the increase in the facility cost can be reduced.

The embodiment described above describes the configuration in which the waste heat recovery boiler 11 is provided to the main exhaust gas line $L_{11A}$, but the waste heat recovery boiler 11 may be configured to be provided to the branch exhaust gas line $L_{11B}$, or the waste heat recovery boiler 11 may be configured to be provided to both the main exhaust gas line $L_{11A}$ and the branch exhaust gas line $L_{11B}$. In a case where waste heat recovery boiler 11 is provided to both the main exhaust gas line $L_{11A}$ and the branch exhaust gas line $L_{11B}$, the integrated combustion exhaust gas $G_{21}$ can be adjusted to a desired temperature by differentiating a recovery amount of the waste heat from the combustion exhaust gas $G_{11A}$ in the waste heat recovery boiler 11 on the main exhaust gas line $L_{11A}$ from a recovery amount of the waste heat from the combustion exhaust gas $G_{11B}$ in the waste heat recovery boiler 11 on the branch exhaust gas line $L_{11B}$. The power generation facility 10 may be an existing power generation facility, or a newly built power generation facility. In a case where the power generation facility 10 is an existing power generation facility, the configuration of the exhaust gas treatment device 1 according to the above-described embodiment can be obtained by simply providing the branch exhaust gas line $L_{11B}$ to an existing exhaust gas line.

Figure 3:
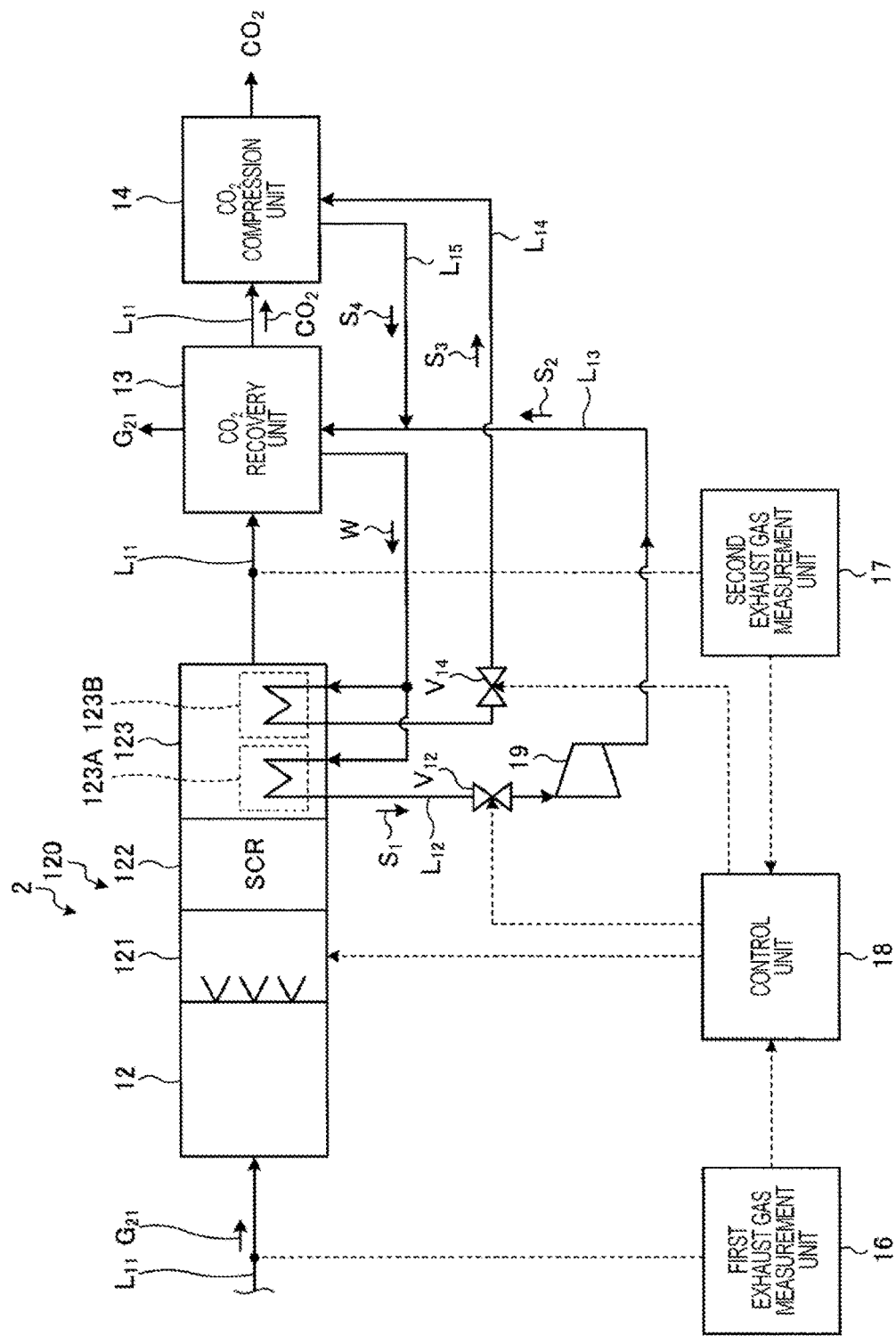
FIG. 3 is a schematic diagram illustrating another example of the exhaust gas treatment device according to the first embodiment.

The configuration of the integrated waste heat recovery boiler 12 in the embodiment described above can be adequately modified. FIG. 3 is a schematic view illustrating another example of the exhaust gas treatment device 1 according to the above-described embodiment. In an exhaust gas treatment device 2 illustrated in FIG. 3, the integrated waste heat recovery boiler 12 includes a steam generation unit 123 provided on a downstream stage of the nitrogen oxide removal unit 120. The steam generation unit 123 includes a turbine-driving steam generation unit 123A provided on a downstream stage of the nitrogen oxide removal unit 120 in the flow direction of the integrated combustion exhaust gas $G_{21}$, and a $CO_2$ compression portion-driving steam generation unit 123B provided on a downstream stage of the turbine-driving steam generation unit 123A.

The turbine-driving steam generation unit 123A recovers the waste heat of the integrated combustion exhaust gas $G_{21}$ from which nitrogen oxide has been removed to generate a turbine-driving steam $S_1$ that is a low-pressure steam for driving the low-pressure steam turbine 19. The turbine-driving steam generation unit 123A supplies the generated turbine-driving steam $S_1$ to the low-pressure steam turbine 19 via a steam supply line $L_{12}$. The low-pressure steam turbine 19 may be a turbine provided outside the exhaust gas treatment device 2, or the low-pressure steam turbine 221 in the power generation facility 10 illustrated in FIG. 2. The low-pressure steam turbine 19 is rotationally driven by the turbine-driving steam $S_1$ to generate power by a generator (not illustrated in the drawing). This allows the exhaust gas treatment device 2 to generate power by using the waste heat of the integrated combustion exhaust gas $G_{21}$ recovered by the integrated waste heat recovery boiler 12, and therefore, the steam required for driving the low-pressure steam turbine 19 can be reduced. The low-pressure steam turbine 19 supplies the turbine-driving steam $S_1$ after driving the turbine as a $CO_2$ absorbing liquid-regenerating steam $S_2$ to the $CO_2$ recovery unit 13 via a steam discharge line $L_{13}$.

The $CO_2$ compression portion-driving steam generation unit 123B recovers the waste heat of the integrated combustion exhaust gas $G_{21}$ from which nitrogen oxide has been removed to generate a $CO_2$ compression portion-driving steam $S_3$ that is a low-pressure steam for driving the $CO_2$ compression portion 14. The $CO_2$ compression portion-driving steam generation unit 123B supplies the generated $CO_2$ compression portion-driving steam $S_3$ to the $CO_2$ compression portion 14 via a steam supply line $L_{14}$. The $CO_2$ compression portion 14 drives the $CO_2$ compression portion by using the $CO_2$ compression portion-driving steam $S_3$ to compress $CO_2$. This allows the exhaust gas treatment device 2 to compress $CO_2$ by using the waste heat of the integrated combustion exhaust gas $G_{21}$ recovered by the integrated waste heat recovery boiler 12, and therefore, the steam required for compressing $CO_2$ can be reduced. The $CO_2$ compression portion 14 supplies the $CO_2$ compression portion-driving steam $S_3$ after driving the $CO_2$ compression portion as a $CO_2$ absorbing liquid-regenerating steam $S_4$ to the $CO_2$ recovery unit 13 via a steam discharge line $L_{15}$.

The $CO_2$ recovery unit 13 supplies the $CO_2$ absorbing liquid-regenerating steams $S_2$ and $S_4$ to a reboiler in the $CO_2$ regeneration tower to release $CO_2$ from the $CO_2$ absorbing liquid having recovered $CO_2$. This allows the exhaust gas treatment device 2 to reduce the steam used for the reboiler in the $CO_2$ absorbing tower. The $CO_2$ recovery unit 13 supplies a condensed water W in which condensed is the $CO_2$ absorbing liquid-regenerating steams $S_2$ and $S_4$ having been used for the reboiler in the $CO_2$ absorbing tower to the turbine-driving steam generation unit 123A and the $CO_2$ compression portion-driving steam generation unit 123B in the integrated waste heat recovery boiler 12.

The control unit 18 controls a supply amount of the fuel F supplied to the combustor 212 in the power generation facility 10, a supply amount of the turbine-driving steam $S_1$ supplied to the low-pressure steam turbine 19, and a supply amount of the $CO_2$ compression portion-driving steam $S_3$ supplied to the $CO_2$ compression portion 14, based on the temperature and gas flow rate of the integrated combustion exhaust gas $G_{21}$, measured by the first exhaust gas measurement unit 16 and introduced into the nitrogen oxide removal unit 120. In a case where the temperature and gas flow rate of the integrated combustion exhaust gas $G_{21}$ introduced into the nitrogen oxide removal unit 120 is less than a predetermined range, the control unit 18 increases the fuel F supplied to the combustor 212 in the power generation facility 10. In a case where the temperature and gas flow rate of the integrated combustion exhaust gas $G_{21}$ introduced into the nitrogen oxide removal unit 120 exceeds the predetermined range, the control unit 18 decreases the fuel F supplied to the combustor 212 in the power generation facility 10. In a case where the temperature and gas flow rate of the integrated combustion exhaust gas $G_{21}$ introduced into the nitrogen oxide removal unit 120 is less than the predetermined range, the control unit 18 decreases an opening amount of at least one of a flow rate control valve $V_{12}$ provided to the steam supply line $L_{12}$ and a flow rate control valve $V_{14}$ provided to the steam supply line $L_{14}$ to decrease the supply amount of at least one of the turbine-driving steam $S_1$ supplied to the low-pressure steam turbine 19 and the $CO_2$ compression portion-driving steam $S_3$ supplied to the $CO_2$ compression portion 14. In a case where the temperature and gas flow rate of the integrated combustion exhaust gas $G_{21}$ introduced into the nitrogen oxide removal unit 120 exceeds the predetermined range, the control unit 18 increases the opening amount of at least one of the flow rate control valve $V_{12}$ provided to the steam supply line $L_{12}$ and the flow rate control valve $V_{14}$ provided to the steam supply line $L_{14}$ to increase the supply amount of at least one of the turbine-driving steam $S_1$ supplied to the low-pressure steam turbine 19 and the $CO_2$ compression portion-driving steam $S_3$ supplied to the $CO_2$ compression portion 14. By such control, the temperature of the integrated combustion exhaust gas $G_{21}$ introduced into the nitrogen oxide removal unit 120 can be controlled to be in a range suitable for decomposing and removing nitrogen oxide, so that nitrogen oxide in the integrated combustion exhaust gas $G_{21}$ can be efficiently reduced.

As described above, according to the exhaust gas treatment device 2 in the above-described embodiment, by virtue of the turbine-driving steam generation unit 123A and the $CO_2$ compression portion-driving steam generation unit 123B in the integrated waste heat recovery boiler 12, the turbine-driving steam $S_1$ required for rotationally driving the low-pressure steam turbine 19, the $CO_2$ compression portion-driving steam $S_3$ required for compressing $CO_2$, and the $CO_2$ absorbing liquid-regenerating steams $S_2$ and $S_4$ required for regenerating the $CO_2$ absorbing liquid can be acquired, so that an amount of the steam used in the whole exhaust gas treatment device 2 can be reduced.

Figure 4:
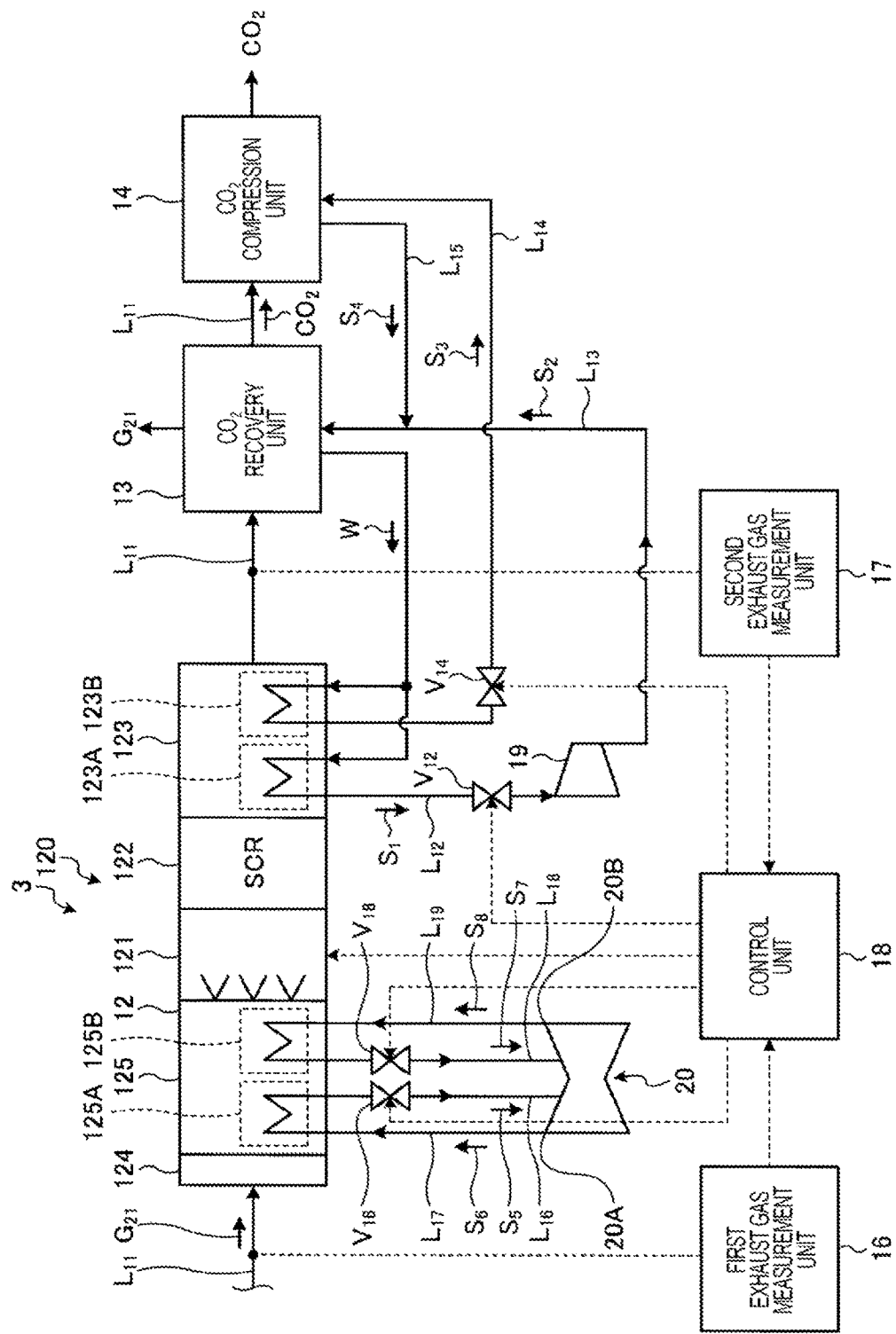
FIG. 4 is a schematic diagram illustrating another example of the exhaust gas treatment device according to the first embodiment.

FIG. 4 is a schematic view illustrating another example of the exhaust gas treatment device 2 according to the above-described embodiment. In an exhaust gas treatment device 3 illustrated in FIG. 4, the integrated waste heat recovery boiler 12 includes, besides the steam generation unit 123 illustrated in FIG. 3, a heating unit 124 provided on a front stage of the nitrogen oxide removal unit 120 where is an introducing part of the integrated combustion exhaust gas $G_{21}$, and a steam generation unit 125 provided between the heating unit 124 and the nitrogen oxide removal unit 120. The steam generation unit 125 is provided on a downstream stage of the heating unit 124, and includes a turbine-driving steam generation unit 125A that generates a high-pressure steam for rotationally driving a high-pressure steam turbine 20A of a medium-pressure/high-pressure steam turbine 20, and a turbine-driving steam generation unit 125B that is provided on a downstream stage of the turbine-driving steam generation unit 125A and generates a medium-pressure steam for rotationally driving a mid-pressure steam turbine 20B of the medium-pressure/high-pressure steam turbine 20.

The heating unit 124 heats the integrated combustion exhaust gas $G_{21}$ introduced into the integrated waste heat recovery boiler 12 (for example, 500° C. or higher and 600° C. or lower), and supplies the heated integrated combustion exhaust gas $G_{21}$ to the turbine-driving steam generation unit 125A in the steam generation unit 125. The integrated combustion exhaust gas $G_{21}$ can be heated by use of a publicly known general heating device. In a case where the temperature of the integrated combustion exhaust gas $G_{21}$ introduced into the integrated waste heat recovery boiler 12 is high, the heating unit 124 may not be necessarily provided.

The turbine-driving steam generation unit 125A recovers the waste heat of the integrated combustion exhaust gas $G_{21}$ heated by the heating unit 124 to generate a turbine-driving steam $S_5$ that is a high-pressure steam for driving the high-pressure steam turbine 20A of the medium-pressure/high-pressure steam turbine 20. The turbine-driving steam generation unit 125A supplies the generated turbine-driving steam $S_5$ to the high-pressure steam turbine 20A via a steam supply line $L_{16}$. The medium-pressure/high-pressure steam turbine 20 may be that provided outside the exhaust gas treatment device 3, or the medium-pressure/high-pressure steam turbine 222 in the power generation facility 10 illustrated in FIG. 2. The high-pressure steam turbine 20A is rotationally driven by the turbine-driving steam $S_5$ to generate power by a generator (not illustrated in the drawing). This allows the exhaust gas treatment device 3 to generate power by using the waste heat of the integrated combustion exhaust gas $G_{21}$ recovered by the integrated waste heat recovery boiler 12, and therefore, the steam required for driving the medium-pressure/high-pressure steam turbine 20 can be reduced. The high-pressure steam turbine 20A supplies a turbine-driving steam $S_6$ after driving the turbine to the turbine-driving steam generation unit 125A via a steam discharge line $L_{17}$.

The turbine-driving steam generation unit 125B recovers the waste heat of the integrated combustion exhaust gas $G_{21}$ heated by the heating unit 124 to generate a turbine-driving steam $S_7$ that is a medium-pressure steam for driving the mid-pressure steam turbine 20B of the medium-pressure/high-pressure steam turbine 20. The turbine-driving steam generation unit 125B supplies the generated turbine-driving steam $S_7$ to the mid-pressure steam turbine 20B via a steam supply line Lis. The mid-pressure steam turbine 20B is rotationally driven by the turbine-driving steam $S_7$ to generate power by a generator (not illustrated in the drawing). This allows the exhaust gas treatment device 3 to generate power by using the waste heat of the integrated combustion exhaust gas $G_{21}$ recovered by the integrated waste heat recovery boiler 12, and therefore, the steam required for driving the mid-pressure steam turbine 20B can be reduced. The mid-pressure steam turbine 20B supplies a turbine-driving steam $S_8$ after driving the turbine to the turbine-driving steam generation unit 125B via a steam discharge line $L_{19}$.

The control unit 18 controls supply amounts of the turbine-driving steams $S_5$ and $S_7$ supplied to the medium-pressure/high-pressure steam turbine 20, based on the temperature and gas flow rate of the integrated combustion exhaust gas $G_{21}$, measured by the first exhaust gas measurement unit 16 and introduced into the nitrogen oxide removal unit 120. In a case where the temperature and gas flow rate of the integrated combustion exhaust gas $G_{21}$ introduced into the nitrogen oxide removal unit 120 is less than a predetermined range, the control unit 18 decreases an opening amount of at least one of a flow rate control valve $V_{16}$ provided to the steam supply line Lib and a flow rate control valve $V_{18}$ provided to the steam supply line Lis to decrease at least one of the turbine-driving steams $S_5$ and $S_7$ supplied to the medium-pressure/high-pressure steam turbine 20. In a case where the temperature and gas flow rate of the integrated combustion exhaust gas $G_{21}$ introduced into the nitrogen oxide removal unit 120 exceeds a predetermined range, the control unit 18 increases the opening amount of at least one of the flow rate control valve $V_{16}$ provided to the steam supply line $L_{16}$ and the flow rate control valve $V_{18}$ provided to the steam supply line $L_{18}$ to increase at least one of the supply amounts of the turbine-driving steams $S_5$ and $S_7$ supplied to the medium-pressure/high-pressure steam turbine 20. By such control, the temperature of the integrated combustion exhaust gas $G_{21}$ introduced into the nitrogen oxide removal unit 120 can be controlled to be in a range suitable for decomposing and removing nitrogen oxide, so that nitrogen oxide in the integrated combustion exhaust gas $G_{21}$ can be efficiently reduced.

As described above, according to the exhaust gas treatment device 3 in the above-described embodiment, by virtue of the turbine-driving steam generation units 125A and 125B in the integrated waste heat recovery boiler 12, the turbine-driving steams $S_5$ and $S_7$ required for rotationally driving the medium-pressure/high-pressure steam turbine 20 can be acquired, so that an amount of the steam used in the whole exhaust gas treatment device 3 can be reduced.

Second Embodiment

Next, a second embodiment of the present invention will be described. In the following embodiment, a description is mainly given of differences from the embodiment described above to omit duplicated explanations. Note that, components the same as those in the first embodiment described above are designated by the same reference signs. Furthermore, embodiments described below can be suitably combined for implementation.

Figure 5:
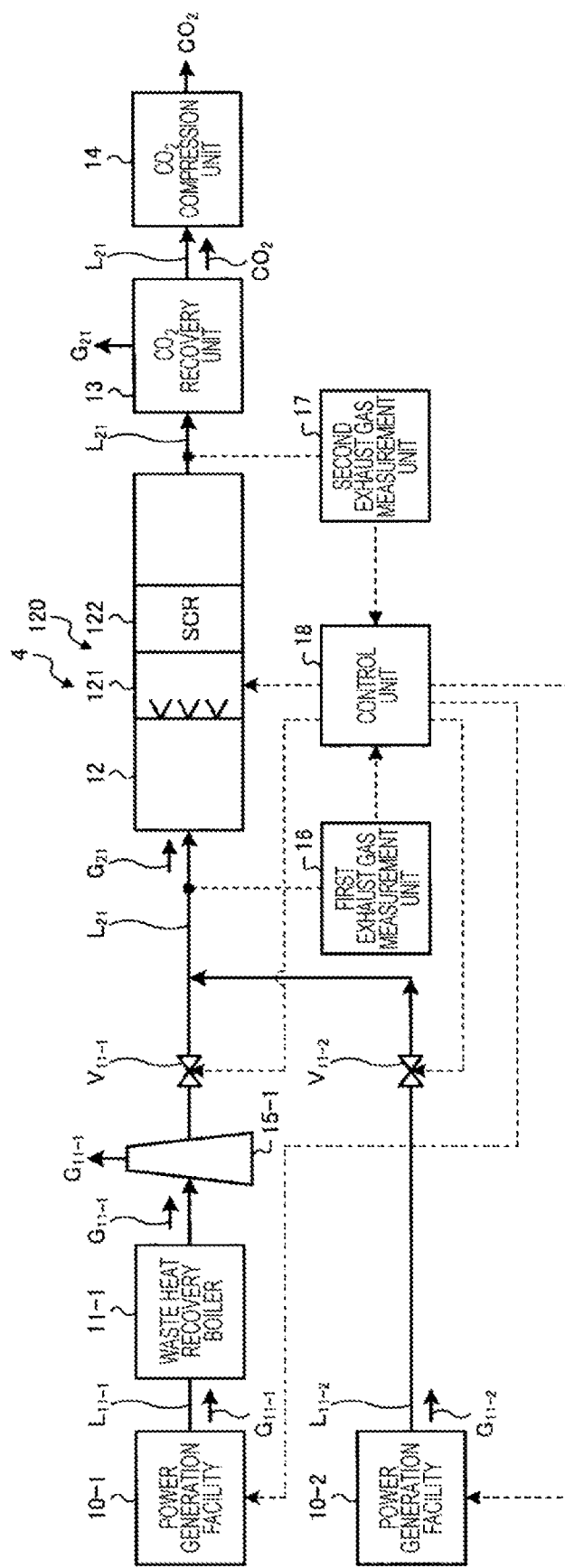
FIG. 5 is a schematic diagram illustrating an example of an exhaust gas treatment device according to a second embodiment.

FIG. 5 is a schematic view illustrating an example of an exhaust gas treatment device 4 according to the second embodiment of the present invention. As illustrated in FIG. 5, the exhaust gas treatment device 4 according to the present embodiment recovers waste heat of combustion exhaust gases $G_{11\text{-}1}$ and $G_{11\text{-}2}$ respectively discharged from two power generation facilities 10-1 and 10-2 by the integrated waste heat recovery boiler 12, and thereafter, recovers $CO_2$ contained in the combustion exhaust gases $G_{11\text{-}1}$ and $G_{11\text{-}2}$ by the $CO_2$ recovery unit 13. The exhaust gas treatment device 4 includes the power generation facility (first power generation facility) 10-1 discharging the combustion exhaust gas (first combustion exhaust gas) $G_{11\text{-}1}$, the power generation facility (second power generation facility) 10-2 discharging the combustion exhaust gas (second combustion exhaust gas) $G_{11\text{-}2}$, a waste heat recovery boiler 11-1 provided on a downstream stage of the power generation facility 10-1 in a flow direction of the combustion exhaust gas $G_{11\text{-}1}$, the integrated waste heat recovery boiler 12 provided on a downstream stage of the waste heat recovery boiler 11-1, the $CO_2$ recovery unit 13 provided on a downstream stage of the integrated waste heat recovery boiler 12, and the $CO_2$ compression portion 14 provided on a downstream stage of the $CO_2$ recovery unit 13. A stack 15-1 discharging a part of the combustion exhaust gas $G_{11\text{-}1}$ is provided between the waste heat recovery boiler 11-1 and the integrated waste heat recovery boiler 12.

The power generation facility 10-1 discharges the combustion exhaust gas $G_{11\text{-}1}$ generated by the power generation to an exhaust gas line (first exhaust gas flow path) $L_{11\text{-}1}$. The exhaust gas line $L_{11\text{-}1}$ is provided with the waste heat recovery boiler 11-1, the stack 15-1, and a flow rate control valve $V_{11\text{-}1}$ in this order. The flow rate control valve $V_{11\text{-}1}$ adjusts a flow rate of the combustion exhaust gas $G_{11\text{-}1}$ flowing through the exhaust gas line $L_{11\text{-}1}$. The waste heat recovery boiler 11-1 recovers the waste heat of the combustion exhaust gas $G_{11\text{-}1}$ that is discharged from the power generation facility 10-1 and flows through the exhaust gas line $L_{11\text{-}1}$, and supplies the combustion exhaust gas $G_{11\text{-}1}$ from which the waste heat has been recovered to the stack 15-1. The stack 15-1 discharges a part of the combustion exhaust gas $G_{11\text{-}1}$ to outside as needed, and supplies the combustion exhaust gas $G_{11\text{-}1}$ to the integrated waste heat recovery boiler 12.

The power generation facility 10-2 discharges the combustion exhaust gas $G_{11\text{-}2}$ generated by the power generation to an exhaust gas line (second exhaust gas flow path) $L_{11\text{-}2}$. The exhaust gas line $L_{11\text{-}2}$ is provided with a flow rate control valve $V_{11\text{-}2}$. The flow rate control valve $V_{11\text{-}2}$ adjusts a flow rate of the combustion exhaust gas $G_{11\text{-}2}$ flowing through the exhaust gas line $L_{11\text{-}2}$.

The integrated waste heat recovery boiler 12 is supplied with the integrated combustion exhaust gas $G_{21}$ in which the combustion exhaust gas $G_{11\text{-}1}$ flowing through the exhaust gas line $L_{11\text{-}1}$ and the combustion exhaust gas $G_{11\text{-}2}$ flowing through the exhaust gas line $L_{11\text{-}2}$ are integrated. The integrated waste heat recovery boiler 12 is provided with the nitrogen oxide removal unit 120 that reduces and removes nitrogen oxide such as nitrogen monoxide and nitrogen dioxide contained in the integrated combustion exhaust gas $G_{21}$.

The exhaust gas treatment device 4 includes the control unit 18 that controls opening amounts of the flow rate control valve $V_{11\text{-}1}$ and flow rate control valve $V_{11\text{-}2}$, and the supply amount of the fuel supplied to the power generation facility 10, based on the gas flow rate and temperature of the integrated combustion exhaust gas $G_{21}$ measured by the first exhaust gas measurement unit 16. The control unit 18 adjusts the opening amounts of the flow rate control valve $V_{11\text{-}1}$ and flow rate control valve $V_{11\text{-}2}$, and the supply amounts of the fuels F supplied to the power generation facilities 10-1 and 10-2 to control such that the temperature of the integrated combustion exhaust gas $G_{21}$ measured by the first exhaust gas measurement unit 16 is 300° C. or higher and 400° C. or lower. By such control, the exhaust gas treatment device 4 can make the temperature of the integrated combustion exhaust gas $G_{21}$ supplied to the nitrogen oxide removal unit 120 in the integrated waste heat recovery boiler 12 a temperature suitable for decomposing and removing nitrogen oxide, so that nitrogen oxide in the integrated combustion exhaust gas $G_{21}$ can be further more efficiently decomposed and removed.

In a case where the temperature of the integrated combustion exhaust gas $G_{21}$ measured by the first exhaust gas measurement unit 16 is lower than 300° C., the control unit 18 controls at least one of the opening amount of the flow rate control valve $V_{11\text{-}1}$ to be decreased and the opening amount of the flow rate control valve $V_{11\text{-}2}$ to be increased, so that a ratio, in the integrated combustion exhaust gas $G_{21}$, of the combustion exhaust gas $G_{11\text{-}2}$ flowing through the exhaust gas line $L_{11\text{-}2}$ is increased with respect to the combustion exhaust gas $G_{11\text{-}1}$ flowing through the exhaust gas line $L_{11\text{-}1}$. This can increase the ratio of the combustion exhaust gas $G_{11\text{-}2}$ relative to the combustion exhaust gas $G_{11\text{-}1}$, where the temperature of the combustion exhaust gas $G_{11\text{-}1}$ is decreased because the heat thereof has been recovered by the waste heat recovery boiler 11-1, and where the temperature of the combustion exhaust gas $G_{11\text{-}2}$ is high because the heat thereof has not been recovered by the waste heat recovery boiler 11-1, and therefore, the temperature of the integrated combustion exhaust gas $G_{21}$ measured by the first exhaust gas measurement unit 16 increases. The control unit 18 may maintain the opening amounts of the flow rate control valve $V_{11\text{-}1}$ and flow rate control valve $V_{11\text{-}2}$ to increase the supply amount of the fuel supplied to the power generation facility 10 so as to increase the temperature of the integrated combustion exhaust gas $G_{21}$.

In a case where the temperature of the integrated combustion exhaust gas $G_{21}$ measured by the first exhaust gas measurement unit 16 exceeds 400° C., the control unit 18 controls at least one of the opening amount of the flow rate control valve $V_{11\text{-}1}$ to be increased and the opening amount of the flow rate control valve $V_{11\text{-}2}$ to be decreased, so that the ratio, in the integrated combustion exhaust gas $G_{21}$, of the combustion exhaust gas $G_{11\text{-}2}$ flowing through the exhaust gas line $L_{11\text{-}2}$ is decreased with respect to the combustion exhaust gas $G_{11\text{-}1}$ flowing through the exhaust gas line $L_{11\text{-}1}$. This can decrease the ratio of the combustion exhaust gas $G_{11\text{-}2}$ relative to the combustion exhaust gas $G_{11\text{-}1}$, where the temperature of the combustion exhaust gas $G_{11\text{-}1}$ is decreased because the heat thereof has been recovered by the waste heat recovery boiler 11-1, and where the temperature of the combustion exhaust gas $G_{11\text{-}2}$ is high because the heat thereof has not been recovered by the waste heat recovery boiler 11-1, and therefore, the temperature of the integrated combustion exhaust gas $G_{21}$ measured by the first exhaust gas measurement unit 16 decreases. The control unit 18 may maintain the opening amounts of the flow rate control valve $V_{11\text{-}1}$ and flow rate control valve $V_{11\text{-}2}$ to decrease the supply amount of the fuel supplied to the power generation facility 10 so as to decrease the temperature of the integrated combustion exhaust gas $G_{21}$. For the other components, descriptions are omitted since the other components are the same as those of the exhaust gas treatment device 1 illustrated in FIG. 1.

Next, the overall operation of the exhaust gas treatment device 4 according to the present embodiment will be described. The combustion exhaust gas $G_{11\text{-}1}$ discharged from the power generation facility 10-1, with the waste heat of the gas $G_{11\text{-}1}$ being recovered by the waste heat recovery boiler 11-1 via the exhaust gas line $L_{11\text{-}1}$ to decrease the temperature, after a part of the gas $G_{11\text{-}1}$ is discharged from the stack 15-1, is supplied to an integrated exhaust gas line $L_{21}$. The combustion exhaust gas $G_{11\text{-}2}$ discharged from the power generation facility 10-2 is supplied via the exhaust gas line $L_{11\text{-}2}$ to the integrated exhaust gas line $L_{21}$. In the integrated exhaust gas line $L_{21}$, the combustion exhaust gas $G_{11\text{-}1}$ and the combustion exhaust gas $G_{11\text{-}2}$ are integrated to obtain the integrated combustion exhaust gas $G_{21}$, where the waste heat of the combustion exhaust gas $G_{11\text{-}1}$ is recovered by the waste heat recovery boiler 11-1 to decrease temperature thereof and the combustion exhaust gas $G_{11\text{-}2}$ has a temperature higher relative to the combustion exhaust gas $G_{11\text{-}1}$, and the resultant integrated combustion exhaust gas $G_{21}$ is supplied to the integrated waste heat recovery boiler 12. Here, the control unit 18 controls the opening amounts of the flow rate control valves $V_{11\text{-}1}$ and $V_{11\text{-}2}$ and the supply amount of the fuel F supplied to the power generation facility 10 as needed, such that the temperature of the integrated combustion exhaust gas $G_{21}$ is a predetermined temperature (for example, 300° C. or higher and 400° C. or lower). The integrated combustion exhaust gas $G_{21}$ supplied to the integrated waste heat recovery boiler 12 is supplied with the reducing agent by the reducing agent supply unit 121 in the nitrogen oxide removal unit 120, and, after nitrogen oxide is decomposed and removed by selective catalytic reduction unit 122, is supplied to the $CO_2$ recovery unit 13. Here, the control unit 18 controls an amount of the reducing agent supplied from the reducing agent supply unit 121 to the integrated combustion exhaust gas $G_{21}$ as needed, such that nitrogen oxide in the integrated combustion exhaust gas $G_{21}$ supplied to the $CO_2$ recovery unit 13 is a predetermined value or less. The integrated combustion exhaust gas $G_{21}$ supplied to the $CO_2$ recovery unit 13, after $CO_2$ is recovered by the $CO_2$ absorbing liquid, is discharged out of the exhaust gas treatment device 4. $CO_2$ in the integrated combustion exhaust gas $G_{21}$ recovered by the $CO_2$ absorbing liquid is heated to be released from the $CO_2$ absorbing liquid, and thereafter, supplied to the $CO_2$ compression portion 14, and compressed and discharged.

As described above, according to the above-described embodiment, the waste heat of the combustion exhaust gas $G_{11-1}$ discharged from the power generation facility 10-1 is recovered by the waste heat recovery boiler 11-1 provided to the exhaust gas line $L_{11-1}$, while the combustion exhaust gas $G_{11-1}$ after the waste heat is recovered is integrated with the combustion exhaust gas $G_{11-2}$ discharged from the power generation facility 10-2 and flowing through the exhaust gas line $L_{11-2}$ in a state of high temperature that the temperature is higher than the combustion exhaust gas $G_{11-1}$, and then, the integrated combustion exhaust gas $G_{21}$ is resulted. This can adjust the temperature of the integrated combustion exhaust gas $G_{21}$ introduced into the integrated waste heat recovery boiler 12 to a range suitable for decomposing and removing nitrogen oxide, such that nitrogen oxide in the combustion exhaust gases $G_{11-1}$ and $G_{11-2}$ discharged from the power generation facility 10 can be efficiently removed. Since the exhaust gas line $L_{11-2}$ that is one of the exhaust gas lines $L_{11-1}$ and $L_{11-2}$ does not need to be provided with the nitrogen oxide removal unit 120, the increase in the facility cost can be also reduced. Therefore, the exhaust gas treatment device 4 can be achieved in which nitrogen oxide can be efficiently removed and the increase in the facility cost can be reduced.

The embodiment described above describes the configuration in which the waste heat recovery boiler 11-1 is provided to the exhaust gas line $L_{11-1}$, but the waste heat recovery boiler 11-1 may be configured to be provided to the exhaust gas line $L_{11-2}$, or the waste heat recovery boiler 11-1 may be configured to be provided to both the exhaust gas line $L_{11-1}$ and the exhaust gas line $L_{11-2}$. In a case where waste heat recovery boiler 11-1 is provided to both the exhaust gas line $L_{11-1}$ and the exhaust gas line $L_{11-2}$, the integrated combustion exhaust gas $G_{21}$ can be adjusted to a desired temperature by differentiating a recovery amount of the waste heat from the combustion exhaust gas $G_{11-1}$ in the waste heat recovery boiler 11-1 on the exhaust gas line $L_{11-1}$ from a recovery amount of the waste heat from the combustion exhaust gas $G_{11-2}$ in the waste heat recovery boiler 11 on the exhaust gas line $L_{11-2}$. Each of two power generation facilities 10-1 and 10-2 may be an existing power generation facility, or a newly built power generation facility. For example, in a case where the power generation facility 10-1 is an existing power generation facility, the integrated combustion exhaust gas $G_{21}$ can be adjusted to a desired temperature only by newly providing the power generation facility 10-2 and the exhaust gas line $L_{11-2}$. The configuration of the integrated waste heat recovery boiler 12 may be the same as the configuration illustrated in FIG. 3 or FIG. 4.

Figure 6:
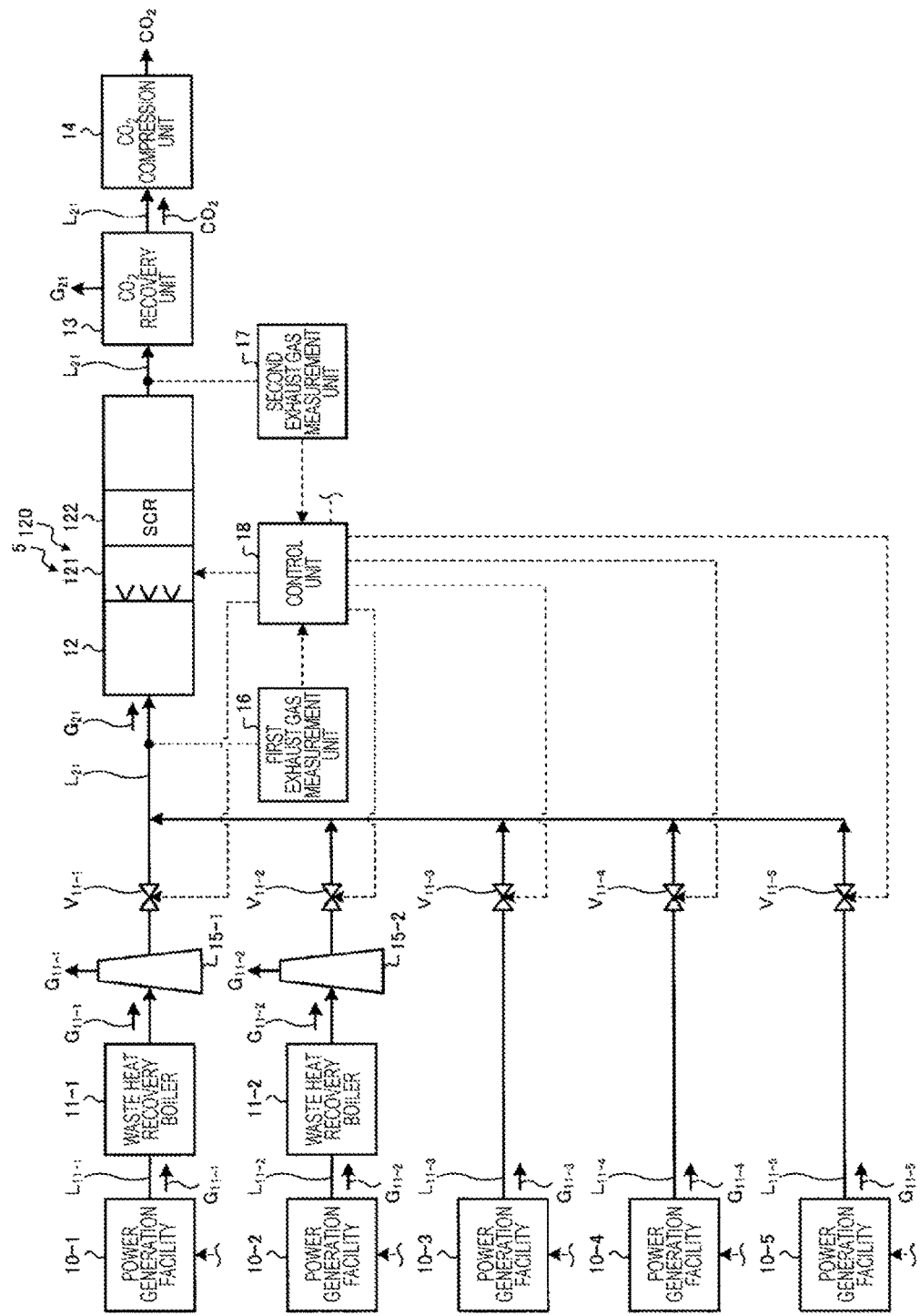
FIG. 6 is a schematic view illustrating another example of the exhaust gas treatment device according to the second embodiment.

FIG. 6 is a schematic view illustrating another example of the exhaust gas treatment device 4 according to the second embodiment of the present invention. As illustrated in FIG. 6, an exhaust gas treatment device 5 according to the present embodiment recovers waste heat of combustion exhaust gases $G_{11-1}$, $G_{11-2}$, $G_{11-3}$, $G_{11-4}$, and $G_{11-5}$ respectively discharged from five power generation facilities 10-1, 10-2, 10-3, 10-4, and 10-5 by the integrated waste heat recovery boiler 12, and thereafter, recovers $CO_2$ contained in the combustion exhaust gases $G_{11-1}$, $G_{11-2}$, $G_{11-3}$, $G_{11-4}$, and $G_{11-5}$ by the $CO_2$ recovery unit 13. The exhaust gas treatment device 5 includes the power generation facility (first power generation facility) 10-1 discharging the combustion exhaust gas (first combustion exhaust gas) $G_{11-1}$, the power generation facility (first power generation facility) 10-2 discharging the combustion exhaust gas (first combustion exhaust gas) $G_{11-2}$, the power generation facility (second power generation facility) 10-3 discharging the combustion exhaust gas (second combustion exhaust gas) $G_{11-3}$, the power generation facility (second power generation facility) 10-4 discharging the combustion exhaust gas (second combustion exhaust gas) $G_{11-4}$, the power generation facility (second power generation facility) 10-5 discharging the combustion exhaust gas (second combustion exhaust gas) $G_{11-5}$, the waste heat recovery boiler 11-1 provided on a downstream stage of the power generation facility 10-1 in a flow direction of the combustion exhaust gas $G_{11-1}$, a waste heat recovery boiler 11-2 provided on a downstream stage of the power generation facility 10-2 in a flow direction of the combustion exhaust gas $G_{11-2}$, the integrated waste heat recovery boiler 12 provided on a downstream stage of the waste heat recovery boiler 11-1, the $CO_2$ recovery unit 13 provided on a downstream stage of the integrated waste heat recovery boiler 12, and the $CO_2$ compression portion 14 provided on a downstream stage of the $CO_2$ recovery unit 13. The stack 15-1 discharging a part of the combustion exhaust gas $G_{11-1}$ is provided between the waste heat recovery boiler 11-1 and the integrated waste heat recovery boiler 12, and a stack 15-2 discharging a part of the combustion exhaust gas $G_{11-2}$ is provided between the waste heat recovery boiler 11-2 and the integrated waste heat recovery boiler 12.

The power generation facilities 10-1 and 10-2 discharge the combustion exhaust gases $G_{11-1}$ and $G_{11-2}$ generated by the power generation to the exhaust gas lines (first exhaust gas flow path) $L_{11-1}$ and $L_{11-2}$.

The exhaust gas lines $L_{11-1}$ and $L_{11-2}$ are provided with respectively the waste heat recovery boilers 11-1 and 11-2, the stacks 15-1 and 15-2, and the flow rate control valves $V_{11-1}$ and $V_{11-2}$ in this order. The flow rate control valves $V_{11-1}$ and $V_{11-2}$ adjust flow rates of the combustion exhaust gases $G_{11-1}$ and $G_{11-2}$ flowing through the exhaust gases lines $L_{11-1}$ and $L_{11-2}$, respectively. The waste heat recovery boilers 11-1 and 11-2 recover the waste heat of the combustion exhaust gases $G_{11-1}$ and $G_{11-2}$ that are discharged from the power generation facilities 10-1 and 10-2 and flow through the exhaust gas lines $L_{11-1}$ and $L_{11-2}$, and supply the combustion exhaust gases $G_{11-1}$ and $G_{11-2}$ from which the waste heat has been recovered to the stacks 15-1 and 15-2, respectively. The stacks 15-1 and 15-2 supply the combustion exhaust gases $G_{11-1}$ and $G_{11-2}$ to the integrated waste heat recovery boiler 12, and discharge a part of the combustion exhaust gases $G_{11-1}$ and $G_{11-2}$ to outside as needed.

The power generation facilities 10-3, 10-4, and 10-5 discharge the combustion exhaust gases $G_{11-3}$, $G_{11-4}$ and $G_{11-5}$ generated by the power generation to the exhaust gas lines (second exhaust gas flow path) $L_{11-3}$, $L_{11-4}$ and $L_{11-5}$, respectively. The exhaust gas lines $L_{11-3}$, $L_{11-4}$ and $L_{11-5}$ are provided with flow rate control valves $V_{11-3}$, $V_{11-4}$, and $V_{11-5}$, respectively.

The flow rate control valves $V_{11-3}$, $V_{11-4}$, and $V_{11-5}$ adjust flow rates of the combustion exhaust gases $G_{11-3}$, $G_{11-4}$, and $G_{11-5}$ flowing through the exhaust gases lines $L_{11-3}$, $L_{11-4}$ and $L_{11-5}$, respectively.

The integrated waste heat recovery boiler 12 is supplied with the integrated combustion exhaust gas $G_{21}$ in which the combustion exhaust gases $G_{11-1}$, $G_{11-2}$, $G_{11-3}$, $G_{11-4}$, and $G_{11-5}$ flowing through the exhaust gas lines $L_{11-1}$, $L_{11-2}$, $L_{11-3}$, $L_{11-4}$, and $L_{11-5}$ are integrated. The integrated waste heat recovery boiler 12 is provided with, within thereof, the nitrogen oxide removal unit 120 that reduces and removes nitrogen oxide such as nitrogen monoxide and nitrogen dioxide contained in the integrated combustion exhaust gas $G_{21}$.

The exhaust gas treatment device 5 includes the control unit 18 that controls opening amounts of the flow rate control valves $V_{11-1}$, $V_{11-2}$, $V_{11-3}$, $V_{11-4}$, and $V_{11-5}$ and supply amounts of the fuels F supplied to the power generation facilities 10-1, 10-2, 10-3, 10-4, and 10-5, based on the gas flow rate and temperature of the integrated combustion exhaust gas $G_{21}$ measured by the first exhaust gas measurement unit 16. The control unit 18 adjusts respectively the opening amounts of the flow rate control valves $V_{11-1}$, $V_{11-2}$, $V_{11-3}$, $V_{11-4}$, and $V_{11-5}$, and the supply amounts of the fuels F supplied to the power generation facilities 10-1, 10-2, 10-3, 10-4, and 10-5 to control such that the temperature of the integrated combustion exhaust gas $G_{21}$ measured by the first exhaust gas measurement unit 16 is 300° C. or higher and 400° C. or lower. By such control, the exhaust gas treatment device 5 can make the temperature of the integrated combustion exhaust gas $G_{21}$ supplied to the nitrogen oxide removal unit 120 in the integrated waste heat recovery boiler 12 a temperature suitable for decomposing and removing nitrogen oxide, so that nitrogen oxide in the integrated combustion exhaust gas $G_{21}$ can be further more efficiently decomposed and removed.

In a case where the temperature of the integrated combustion exhaust gas $G_{21}$ measured by the first exhaust gas measurement unit 16 is lower than 300° C., the control unit 18 controls at least one of the opening amounts of the flow rate control valves $V_{11-1}$ and $V_{11-2}$ to be decreased and the opening amounts of the flow rate control valves $V_{11-3}$, $V_{11-4}$, and $V_{11-5}$ to be increased, so that a ratio, in the integrated combustion exhaust gas $G_{21}$, of the combustion exhaust gases $G_{11-3}$, $G_{11-4}$, and $G_{11-5}$ flowing through the exhaust gas lines $L_{11-3}$, $L_{11-4}$, and $L_{11-5}$ is increased with respect to the combustion exhaust gases $G_{11-1}$ and $G_{11-2}$ flowing through the exhaust gas lines $L_{11-1}$ and $L_{11-2}$. This can increase the ratio of the combustion exhaust gases $G_{11-3}$, $G_{11-4}$, and $G_{11-5}$ relative to the combustion exhaust gases $G_{11-1}$ and $G_{11-2}$, where the temperatures of the combustion exhaust gases $G_{11-1}$ and $G_{11-2}$ are decreased because the heats thereof have been recovered by the waste heat recovery boilers 11-1 and 11-2, and where the temperatures of the combustion exhaust gases $G_{11-3}$, $G_{11-4}$, and $G_{11-5}$ are high because the heats thereof have not been recovered by the waste heat recovery boilers 11-1 and 11-2, and therefore, the temperature of the integrated combustion exhaust gas $G_{21}$ measured by the first exhaust gas measurement unit 16 increases. The control unit 18 may maintain the opening amounts of the flow rate control valves $V_{11-1}$, $V_{11-2}$, $V_{11-3}$, $V_{11-4}$, and $V_{11-5}$ to increase the supply amounts of the fuels F supplied to the power generation facilities 10-1, 10-2, 10-3, 10-4, and 10-5 so as to increase the temperature of the integrated combustion exhaust gas $G_{21}$.

In a case where the temperature of the integrated combustion exhaust gas $G_{21}$ measured by the first exhaust gas measurement unit 16 exceeds 400° C., the control unit 18 controls at least one of the opening amounts of the flow rate control valves $V_{11-1}$ and $V_{11-2}$ to be increased and the opening amounts of the flow rate control valves $V_{11-3}$, $V_{11-4}$, and $V_{11-5}$ to be decreased, so that the ratio, in the integrated combustion exhaust gas $G_{21}$, of the combustion exhaust gases $G_{11-3}$, $G_{11-4}$, and $G_{11-5}$ flowing through the exhaust gas lines $L_{11-3}$, $L_{11-4}$, and $L_{11-5}$ is decreased with respect to the combustion exhaust gas $G_{11-1}$ and $G_{11-2}$ flowing through the exhaust gas lines $L_{11-1}$ and $L_{11-2}$. This can decrease the ratio of the combustion exhaust gases $G_{11-3}$, $G_{11-4}$, and $G_{11-5}$ relative to the combustion exhaust gases $G_{11-1}$ and $G_{11-2}$, where the temperatures of the combustion exhaust gases $G_{11-1}$ and $G_{11-2}$ are decreased because the heats thereof have been recovered by the waste heat recovery boilers 11-1 and 11-2, and where the temperatures of the combustion exhaust gases $G_{11-3}$, $G_{11-4}$, and $G_{11-5}$ are high because the heats thereof have not been recovered by the waste heat recovery boilers 11-1 and 11-2, and therefore, the temperature of the integrated combustion exhaust gas $G_{21}$ measured by the first exhaust gas measurement unit 16 decreases. The control unit 18 may maintain the opening amounts of the flow rate control valves $V_{11-1}$, $V_{11-2}$, $V_{11-3}$, $V_{11-4}$, and $V_{11-5}$ to decrease the supply amount of the fuel supplied to the power generation facility 10 so as to decrease the temperature of the integrated combustion exhaust gas $G_{21}$. For the other components, descriptions are omitted since the other components are the same as those of the exhaust gas treatment device 1 illustrated in FIG. 1.

Next, the overall operation of the exhaust gas treatment device 5 according to the present embodiment will be described. The combustion exhaust gases $G_{11-1}$ and $G_{11-2}$ discharged from the power generation facilities 10-1 and 10-2, with the waste heat of the gases $G_{11-1}$ and $G_{11-2}$ being recovered by the waste heat recovery boilers 11-1 and 11-2 via the exhaust gas lines $L_{11-1}$ and $L_{11-2}$ to decrease the temperatures, after a part of the gases $G_{11-1}$ and $G_{11-2}$ is discharged from the stacks 15-1 and 15-2, are supplied to an integrated exhaust gas line $L_{21}$. The combustion exhaust gases $G_{11-3}$, $G_{11-4}$, and $G_{11-5}$ discharged from the power generation facilities 10-3, 10-4, and 10-5 are supplied via the exhaust gas lines $L_{11-3}$, $L_{11-4}$, and $L_{11-5}$ to the integrated exhaust gas line $L_{21}$. In the integrated exhaust gas line $L_{21}$, the combustion exhaust gases $G_{11-1}$ and $G_{11-2}$ and the combustion exhaust gases $G_{11-3}$, $G_{11-4}$, and $G_{11-5}$ are integrated to obtain the integrated combustion exhaust gas $G_{21}$, where the waste heat of the combustion exhaust gases $G_{11-1}$ and $G_{11-2}$ is recovered by the waste heat recovery boilers 11-1 and 11-2 to decrease the temperatures thereof and the combustion exhaust gases $G_{11-3}$, $G_{11-4}$, and $G_{11-5}$ have temperatures higher relative to the combustion exhaust gases $G_{11-1}$ and $G_{11-2}$, and the resultant integrated combustion exhaust gas $G_{21}$ is supplied to the integrated waste heat recovery boiler 12. Here, the control unit 18 controls the opening amounts of the flow rate control valves $V_{11-1}$ and $V_{11-2}$ and the supply amount of the fuel supplied to the power generation facility 10 as needed, such that the temperature of the integrated combustion exhaust gas $G_{21}$ is a predetermined temperature (for example, 300° C. or higher and 400° C. or lower). The integrated combustion exhaust gas $G_{21}$ supplied to the integrated waste heat recovery boiler 12 is supplied with the reducing agent by the reducing agent supply unit 121 in the nitrogen oxide removal unit 120, and, after nitrogen oxide is decomposed and removed by selective catalytic reduction unit 122, is supplied to the $CO_2$ recovery unit 13. Here, the control unit 18 controls an amount of the reducing agent supplied from the reducing agent supply unit 121 to the integrated combustion exhaust gas $G_{21}$ as needed, such that nitrogen oxide in the integrated combustion exhaust gas $G_{21}$ supplied to the $CO_2$ recovery unit 13 is a predetermined value or less. The integrated combustion exhaust gas $G_{21}$ supplied to the $CO_2$ recovery unit 13, after $CO_2$ is recovered by the $CO_2$ absorbing liquid, is discharged out of the exhaust gas treatment device 5. $CO_2$ in the integrated combustion exhaust gas $G_{21}$ recovered by the $CO_2$ absorbing liquid is heated to be released from the $CO_2$ absorbing liquid, and thereafter, supplied to the $CO_2$ compression portion 14, and compressed and discharged.

As described above, according to the above-described embodiment, the waste heat of the combustion exhaust gases $G_{11-1}$ and $G_{11-2}$ discharged from the power generation facilities 10-1 and 10-2 is recovered by the waste heat recovery boilers 11-1 and 11-2 provided to the exhaust gas lines $L_{11-1}$ and $L_{11-2}$, while the combustion exhaust gases $G_{11-1}$ and $G_{11-2}$ after the waste heat is recovered are integrated with the combustion exhaust gas $G_{11-2}$ discharged from the power generation facilities 10-3, 10-4, and 10-5 and flowing through the exhaust gas lines $L_{11-3}$, $L_{11-4}$, and $L_{11-5}$ in a state of high temperature that the temperature is higher than the combustion exhaust gases $G_{11-1}$ and $G_{11-2}$, and then, the integrated combustion exhaust gas $G_{21}$ is resulted. This can adjust the temperature of the integrated combustion exhaust gas $G_{21}$ introduced into the integrated waste heat recovery boiler 12 to a range suitable for decomposing and removing nitrogen oxide, such that nitrogen oxide in the combustion exhaust gas discharged from the power generation facility 10 can be efficiently removed. Since at least one exhaust gas line (three exhaust gas lines $L_{11-3}$, $L_{11-4}$, and $L_{11-5}$ in the present embodiment) of the exhaust gas lines $L_{11-1}$, $L_{11-2}$, $L_{11-3}$, $L_{11-4}$, and $L_{11-5}$ do not need to be provided with the nitrogen oxide removal unit 120, the increase in the facility cost can be also reduced. Therefore, the exhaust gas treatment device 5 can be achieved in which nitrogen oxide can be efficiently removed and the increase in the facility cost can be reduced.

The embodiment described above describes the configuration in which the waste heat recovery boilers 11-1 and 11-2 are provided to the exhaust gas lines $L_{11-1}$ and $L_{11-2}$, but the waste heat recovery boiler 11 may be configured to be provided to at least one exhaust gas line $L_{11}$, or the waste heat recovery boiler 11 may be configured to be provided to all of the exhaust gas lines $L_{11-1}$, $L_{11-2}$, $L_{11-3}$, $L_{11-4}$, and $L_{11-5}$. In this case, the integrated combustion exhaust gas $G_{21}$ can be adjusted to a desired temperature by differentiating recovery amounts of the waste heat from the combustion exhaust gases $G_{11-1}$, $G_{11-2}$, $G_{11-3}$, $G_{11-4}$, and $G_{11-5}$ in the waste heat recovery boiler 11 on the exhaust gas lines $L_{11-1}$, $L_{11-2}$, $L_{11-3}$, $L_{11-4}$, and $L_{11-5}$. Each of the power generation facilities 10-1, 10-2, 10-3, 10-4, and 10-5 may be an existing power generation facility, or a newly built power generation facility. The configuration of the integrated waste heat recovery boiler 12 may be the same as the configuration illustrated in FIG. 3 or FIG. 4.

EXAMPLE

The present inventors investigated in detail effects to reduce the accumulation amount of the nitrogen oxide ($NO_2$)-derived component in the $CO_2$ absorbing liquid in the exhaust gas treatment device according to the above-described embodiment. Hereinafter, content investigated by the present inventor will be described.

Figure 7:
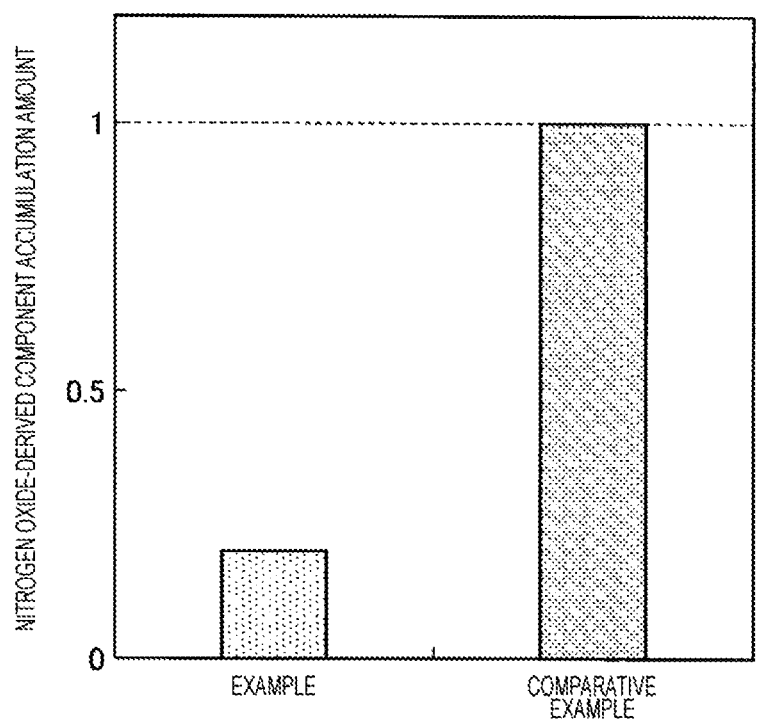
FIG. 7 is a graph illustrating an accumulation amount of a nitrogen oxide-derived component in a $CO_2$ absorbing liquid in an exhaust gas treatment device according to an example and a comparative example.

FIG. 7 is an explanatory diagram illustrating an accumulation amount of a nitrogen oxide-derived component in a $CO_2$ absorbing liquid in the exhaust gas treatment device according to an example and a comparative example. FIG. 7 illustrates a comparison, in the exhaust gas treatment device according to the above-described embodiment, between the accumulation amount of the nitrogen oxide-derived component in a case where an exhaust gas temperature of the integrated combustion exhaust gas $G_{21}$ introduced into the nitrogen oxide removal unit 120 was made to be in a range of 300° C. or higher and 400° C. or lower (refer to the working example), and the accumulation amount of the nitrogen oxide-derived component in a case where an exhaust gas temperature of the combustion exhaust gas introduced into the nitrogen oxide removal unit 120 was made to be 250° C. (refer to the comparative example). As illustrated in FIG. 7, by adjusting the exhaust gas temperature of the integrated combustion exhaust gas $G_{21}$ to the range of 300° C. or greater and 400° C. or lower, the accumulation amount of the nitrogen oxide-derived component in the $CO_2$ absorbing liquid can be reduced to 0.2 times and a reclaiming frequency of the $CO_2$ absorbing liquid can be reduced to about one-fifth as compared with the case that the exhaust gas temperature the combustion exhaust gas is made to be 250° C. From this result, according to the exhaust gas treatment device of the above-described embodiment, it can be seen that the nitrogen oxide accumulated in the $CO_2$ absorbing liquid can be extremely reduced, and an operation cost of the exhaust gas treatment device can be reduced.

REFERENCE SIGNS LIST 1, 2, 3, 4, 5 Exhaust gas treatment device
10, 10-1, 10-2, 10-3, 10-4, 10-5 Power generation facility
11 Waste heat recovery boiler
12 Integrated waste heat recovery boiler
13 $CO_2$ recovery unit
14 $CO_2$ compression portion
15 Stack
16 First exhaust gas measurement unit
17 Second exhaust gas measurement unit
18 Control unit
19 Low-pressure steam turbine
20 Mid-pressure/high-pressure steam turbine
210 Gas turbine
211 Compressor
212 Combustor
213 Turbine
221 Low-pressure steam turbine
222 Mid-pressure/high-pressure steam turbine
222A Mid-pressure steam turbine
222B High-pressure steam turbine
230 Generator
240 Turbine
A Air
F Fuel
$G_{11}$, $G_{11-1}$, $G_{11-2}$, $G_{11-3}$, $G_{11-4}$, $G_{11-5}$ Combustion exhaust gas
$G_{21}$ Integrated combustion exhaust gas
$L_{11}$, $L_{11-1}$, $L_{11-2}$, $L_{11-3}$, $L_{11-4}$, $L_{11-5}$ Exhaust gas line
$L_{11A}$ Main exhaust gas line
$L_{11B}$ Branch exhaust gas line
$L_{21}$ Integrated exhaust gas line $V_{11A}$, $V_{11B}$, $V_{11-1}$, $V_{11-2}$, $V_{11-3}$, $V_{11-4}$, $V_{11-5}$ Flow rate control valve

The invention claimed is:

1. An exhaust gas treatment device comprising:
a first exhaust gas flow path through which a first combustion exhaust gas discharged from a power generation facility flows;
a waste heat recovery unit provided to the first exhaust gas flow path and recovers waste heat of the first combustion exhaust gas;
a second exhaust gas flow path branched from the first exhaust gas flow path and provided between a front stage and downstream stage of the waste heat recovery unit on the first exhaust gas flow path, in which at least a part of the first combustion exhaust gas flowing through the first exhaust gas flow path flows, as a second combustion exhaust gas, through the second exhaust gas flow path;
a nitrogen oxide removal unit configured to remove nitrogen oxide in an integrated combustion exhaust gas into which the first combustion exhaust gas and the second combustion exhaust gas are integrated, the first combustion exhaust gas flowing through the first exhaust gas flow path with the waste heat of the first combustion exhaust gas having been recovered by the waste heat recovery unit, and the second combustion exhaust gas flowing through the second exhaust gas flow path with a temperature of the second combustion exhaust gas being higher relative to the first combustion exhaust gas;
an integrated waste heat recovery unit configured to recover waste heat of the integrated combustion exhaust gas with the nitrogen oxide having been removed by the nitrogen oxide removal unit; and
a $CO_2$ recovery unit configured to recover $CO_2$ in the integrated combustion exhaust gas by a $CO_2$ absorbing liquid with the waste heat of the integrated combustion exhaust gas having been recovered by the integrated waste heat recovery unit.

2. The exhaust gas treatment device according to claim 1, further comprising:
a control unit that adjusts a flow rate of the first combustion exhaust gas flowing through the first exhaust gas flow path and a flow rate of the second combustion exhaust gas flowing through the second exhaust gas flow path to control such that a temperature of the integrated combustion exhaust gas introduced into the nitrogen oxide removal unit is 300° C. or higher and 400° C. or lower.

3. An exhaust gas treatment device comprising:
a first exhaust gas flow path through which a first combustion exhaust gas discharged from a first power generation facility flows;
a second exhaust gas flow path through which a second combustion exhaust gas discharged from a second power generation facility flows;
a waste heat recovery unit provided to the first exhaust gas flow path and recovers waste heat of the first combustion exhaust gas;
a nitrogen oxide removal unit configured to remove nitrogen oxide in an integrated combustion exhaust gas into which the first combustion exhaust gas and the second combustion exhaust gas are integrated, the first combustion exhaust gas flowing through the first exhaust gas flow path with the waste heat of the first combustion exhaust gas having been recovered by the waste heat recovery unit, and the second combustion exhaust gas flowing through the second exhaust gas flow path with a temperature of the second combustion exhaust gas being higher relative to the first combustion exhaust gas;
an integrated waste heat recovery unit configured to recover waste heat of the integrated combustion exhaust gas with the nitrogen oxide having been removed by the nitrogen oxide removal unit; and
a $CO_2$ recovery unit that recovers $CO_2$ in the integrated combustion exhaust gas by a $CO_2$ absorbing liquid with the waste heat of the integrated combustion exhaust gas having been recovered by the integrated waste heat recovery unit.

4. The exhaust gas treatment device according to claim 3, further comprising:
a control unit configured to adjust a flow rate of each of the combustion exhaust gases flowing through the first exhaust gas flow path and the second exhaust gas flow path to control such that a temperature of the integrated combustion exhaust gas introduced into the nitrogen oxide removal unit is 300° C. or higher and 400° C. or lower.

5. The exhaust gas treatment device according to claim 1, wherein
the nitrogen oxide removal unit is provided within the integrated waste heat recovery unit.

6. The exhaust gas treatment device according to claim 1, wherein
the nitrogen oxide removal unit includes a reducing agent injection unit configured to inject a nitrogen oxide removal catalyst removing the nitrogen oxide and a reducing agent.

7. The exhaust gas treatment device according to claim 6, further comprising:
a control unit configured to control a supply amount of the reducing agent, based on a gas flow rate and nitrogen oxide concentration of the integrated combustion exhaust gas introduced into the $CO_2$ recovery unit.

8. The exhaust gas treatment device according to claim 1, wherein the integrated waste heat recovery unit generates a $CO_2$ compression portion-driving steam for compressing $CO_2$ discharged from the $CO_2$ recovery unit by using the waste heat of the integrated combustion exhaust gas with the nitrogen oxide having been removed, and supplies the generated $CO_2$ compression portion-driving steam to a $CO_2$ compression portion.

9. The exhaust gas treatment device according to claim 1, wherein the integrated waste heat recovery unit generates a turbine-driving steam by using the waste heat of the integrated combustion exhaust gas with the nitrogen oxide having been removed, and supplies the generated turbine-driving steam to a steam turbine.

10. The exhaust gas treatment device according to claim 1, wherein a heating unit configured to heat the integrated combustion exhaust gas is provided on a front stage of the nitrogen oxide removal unit, the integrated waste heat recovery unit generates the turbine-driving steam by using the waste heat of the integrated combustion exhaust gas heated by the heating unit, and supplies the generated turbine-driving steam to the steam turbine.

11. The exhaust gas treatment device according to claim 9, further comprising:
a control unit configured to measure the temperature and gas flow rate of the integrated combustion exhaust gas introduced into the nitrogen oxide removal unit, and control at least one of an amount of a fuel supplied to a combustor in the power generation facility and an amount of the steam supplied to the steam turbine, based on the measured temperature and gas flow rate.

12. The exhaust gas treatment device according to claim 1, wherein the power generation facility includes an existing power generation facility.

13. A exhaust gas treatment method comprising the steps of:
    removing nitrogen oxide in an integrated combustion exhaust gas into which a first combustion exhaust gas and a second combustion exhaust gas are integrated, the first combustion exhaust gas being discharged from a power generation device with waste heat of the first combustion exhaust gas having been recovered by a waste heat recovery unit which is provided to a first exhaust gas flow path, and the second combustion exhaust gas flowing through a second exhaust gas flow path which is provided to be connected between a front stage and a downstream stage of the waste heat recovery unit on the first exhaust gas flow path with a temperature of the second combustion exhaust gas being higher relative to the first combustion exhaust gas from which the waste heat has been recovered by the waste heat recovery unit;
    recovering waste heat of the integrated combustion exhaust gas with the nitrogen oxide having been removed; and
    recovering $CO_2$ in the integrated combustion exhaust gas by a $CO_2$ absorbing liquid, the waste heat of the integrated combustion exhaust gas having been recovered.

14. An exhaust gas treatment method comprising the steps of:
    removing nitrogen oxide in an integrated combustion exhaust gas into which a first combustion exhaust gas and a second combustion exhaust gas are integrated, the first combustion exhaust gas being discharged from a first power generation device with waste heat of the first combustion exhaust gas having been recovered by a waste heat recovery unit which is provided to a first exhaust gas flow path, and the second combustion exhaust gas being discharged from a second power generation device and flowing through a second exhaust gas flow path with a temperature of the second combustion exhaust gas being higher relative to the first combustion exhaust gas from which the waste heat has been recovered by the waste heat recovery unit;
    removing nitrogen oxide in the integrated combustion exhaust gas into which combustion exhaust gases are integrated, the combustion exhaust gases being discharged and flowing through a plurality of exhaust gas flow paths at least one of which is provided with a waste heat recovery unit that recovers waste heat of the combustion exhaust gas;
    recovering waste heat of the integrated combustion exhaust gas with the nitrogen oxide having been removed; and
    recovering $CO_2$ in the integrated combustion exhaust gas by a $CO_2$ absorbing liquid, the waste heat of the integrated combustion exhaust gas having been recovered.

* * * * *